US011891273B2

(12) United States Patent
Yun et al.

(10) Patent No.: US 11,891,273 B2
(45) Date of Patent: Feb. 6, 2024

(54) OVERSPEED AND REVERSE DRIVE PREVENTING DEVICE FOR ESCALATOR

(71) Applicant: TAESUNG ESCALATOR CO.,LTD., Seoul (KR)

(72) Inventors: Sam-Dug Yun, Seoul (KR); Sang-Soo Park, Seoul (KR)

(73) Assignee: TAESUNG ESCALATOR CO., LTD.

( * ) Notice: Subject to any disclaimer, the term of this patent is extended or adjusted under 35 U.S.C. 154(b) by 320 days.

(21) Appl. No.: 17/537,458

(22) Filed: Nov. 29, 2021

(65) Prior Publication Data

US 2022/0089412 A1 Mar. 24, 2022

Related U.S. Application Data

(63) Continuation of application No. PCT/KR2019/015382, filed on Nov. 13, 2019.

(30) Foreign Application Priority Data

May 28, 2019 (KR) ........................ 10-2019-0062303
Oct. 25, 2019 (KR) ........................ 10-2019-0133460

(51) Int. Cl.
*B66B 23/02* (2006.01)
*B66B 21/02* (2006.01)
*B66B 29/00* (2006.01)

(52) U.S. Cl.
CPC .............. *B66B 23/02* (2013.01); *B66B 21/02* (2013.01); *B66B 29/00* (2013.01)

(58) Field of Classification Search
CPC .......... B66B 23/02; B66B 21/02; B66B 29/00
See application file for complete search history.

(56) References Cited

U.S. PATENT DOCUMENTS 1,566,475 A * 12/1925 Handy et al. ........... B66B 29/00 192/147
2,096,583 A * 10/1937 Handy .................... B66B 29/00 192/116.5

(Continued)

FOREIGN PATENT DOCUMENTS

KR 10-1888950 B1 * 8/2018 ............. B66B 23/02
KR 20190050930 A * 5/2019 ............. B66B 23/02

(Continued)

OTHER PUBLICATIONS

KR101888950B1 Apparatus for preventing reverse rotation of escalator—translation, EPO (Year: 2023).*

(Continued)

*Primary Examiner* — Mark A Deuble
(74) *Attorney, Agent, or Firm* — Park & Associates IP Law Office

(57) ABSTRACT

The present invention relates to an overspeed and reverse drive preventing device for an escalator. The device has a pawl and a connection part mounted to be connected by a tension spring such that, when the pawl is inserted into gears of the ratchet and is compressed by a ratchet, the tension spring is extended and the pawl is perfectly inserted into the ratchet, thereby making it possible to apply the same to escalators having various specifications. A braking member is mounted on the inner peripheral surface of a brake arm mounted outside a ratchet part or a rotary shaft, or on the outer peripheral surface of the device facing the brake arm. Therefore, the overspeed and reverse drive preventing device can apply additional braking power to the escalator rotary shaft to prevent a damage of a brake lining mounted on the ratchet part, prevent overspeed or reverse rotation of the escalator even though the brake lining is damage so as not to show the braking power, and reduce installation expenses and period of time and prevent deterioration in (Continued)

durability caused by perforation work since there is no need to perform perforation work to the escalator rotary shaft and the escalator support frame.

11 Claims, 18 Drawing Sheets

(56) References Cited

U.S. PATENT DOCUMENTS

| | | | | | |
|---|---|---|---|---|---|
| 2,259,366 | A | * | 10/1941 | Dunlop | B66B 29/00 192/137 |
| 2,460,017 | A | * | 1/1949 | Lautrup | B66B 29/00 198/323 |

FOREIGN PATENT DOCUMENTS

| | | | | | |
|---|---|---|---|---|---|
| WO | WO-2015198445 | A1 | * | 12/2015 | B66B 23/02 |
| WO | WO-2018011960 | A1 | * | 1/2018 | B66B 23/02 |

OTHER PUBLICATIONS

KR20190050930A Main bracket of the apparatus for preventing reverse rotation of escalator-translation, EPO (Year: 2023).*

* cited by examiner

OVERSPEED AND REVERSE DRIVE PREVENTING DEVICE FOR ESCALATOR

REFERENCE TO RELATED APPLICATIONS

This is a continuation of International Patent Application PCT/KR2019/015382 filed on Nov. 13, 2019, which designates the United States and claims priority of Korean Patent Application No. 10-2019-0062303 filed on May 28, 2019, and Korean Patent Application No. 10-2019-0133460 filed on Oct. 25, 2019, the entire contents of which are incorporated herein by reference.

FIELD OF THE INVENTION

The present invention relates to an overspeed and reverse drive preventing device, and more particularly, to an overspeed and reverse drive preventing device, which can prevent an escalator rotary shaft moving stairs of the escalator from overspeeding and driving reversely using a pawl and a ratchet, and which includes a braking member mounted on the inner and outer peripheral surfaces or the outer peripheral surface of the escalator rotary shaft so as to increase braking power.

BACKGROUND OF THE INVENTION

Escalators are vehicles for automatically moving persons or goods upwards or downwards by moving stairs by power.

Such escalators have been widely used in public facilities, such as subway stations and department stores. The escalator moves slowly but runs continuously. So, the escalator has a merit that lots of people can use at once.

In general, the escalator ascends and descends when a gearing chain moves through a rotary shaft rotated by a driving motor and a plurality of stairs move along a slope in order. If lots of people step on the escalator at once or the escalator is operated for a long time, reverse rotation or overspeed may occur due to mechanical or electronic defects or malfunction.

In order to solve the problem, Korean Patent No. 10-1888950 (hereinafter, called a ‘conventional art’) discloses a reverse rotation preventing apparatus for an escalator.

FIG. 1 is a perspective view of a reverse rotation preventing apparatus according to a conventional art, and FIG. 2 is an exploded perspective view of FIG. 1.

As illustrated in FIGS. 1 and 2, the reverse rotation preventing apparatus 100 is installed on an escalator rotary shaft 500 on which driving sprockets 600 as a driving means of an escalator is mounted and on an escalator support frame 700 which is an internal structure previously installed in the escalator.

The reverse rotation preventing apparatus 100 according to the conventional art includes: a ratchet gear module 110 which is coupled and fixed on the escalator rotary shaft 500; a driving module 120 which is selectively connected to the ratchet gear module 110 and limits rotation of the ratchet gear module 110 in order to stop rotation of the escalator rotary shaft 500 if a reverse rotation or overspeed rotation exceeding an ordinary running speed is sensed; and a solenoid part 130 for operating the driving module 120 by a signal received from a sensing unit (not shown) which senses the reverse rotation or overspeed of the escalator rotary shaft 500.

The ratchet gear module 110 includes: a ratchet wheel 111 which is formed in a saw-toothed shape and is rotatably joined to the outer face of the escalator rotary shaft 500; ratchet fixing flanges 112 and 112' which are formed in a ring shape and are respectively joined to right and left sides of the ratchet wheel 111; brake linings 113 and 113' which respectively get in contact with outer surfaces of the ratchet fixing flanges 112 and 112'; side flanges 114 and 114' which are respectively located on the outer faces of the brake linings 113 and 113' and respectively have protrusion parts 1141 inserted into the ratchet wheel 111 and the ratchet fixing flanges 112 and 112'; a bushing 115 which is formed in a ring shape and is inserted and mounted between the ratchet wheel 111 and the side flange 114; and main brackets 116 and 116' which are respectively located on outer surfaces of the side flanges 114 and 114'.

The ratchet wheel 111 is formed in a saw-toothed shape, and is rotatably joined to the outer face of the escalator rotary shaft 500. If there is reverse rotation or overspeed on the escalator, the saw-tooth is caught to a stopper part 121 of the driving module 120, which will be described later, to stop the rotation, thereby stopping the rotation of the escalator rotary shaft 500.

The brake linings 113 and 113' respectively get in contact with the outer surfaces of the ratchet fixing flanges 112 and 112'. If the rotation of the ratchet wheel 111 is limited by the stopper part 121, the rotation of the ratchet wheel 111 stops by friction force between the ratchet wheel 111 and the outer surface of the ratchet fixing flange 112 so as to stop the rotation of the escalator rotary shaft 500.

The side flange 114 is formed in a hollow cylindrical shape, is located on the outer face of the brake lining 113, and is joined with the escalator rotary shaft 500 so that the ratchet gear module 110 can be rotated integrally by the rotation of the escalator rotary shaft 500.

In this instance, the side flange 114 includes: a side flange body 1141 formed in a hollow cylindrical shape; and a flange 1142 expanding outwards from the outer peripheral surface of the side flange body 1141 and having an inner surface to which the brake lining 113 is joined.

Moreover, a plurality of coupling grooves 1143 are formed on the side flange body 1141, and the side flanges 114 and 114' are joined by a wrench bolt 1144 so that the front surface of the side flange body 1141 gets in contact with the front surface of the other side flange body.

The bushing 115 is formed in a ring shape, is inserted between the side flange 114 and an assembly of the ratchet wheel 111 and the ratchet fixing flange 112 in order to prevent abrasion by friction, and perfectly presses the side flange 114 and the assembly of the ratchet wheel 111 and the ratchet fixing flange 112 not to be separated from each other.

The main bracket 116 is connected with the driving module 120 to keep the fixed state without rotation, and includes a first bracket 1161 having a fixing part 1162 which has an arc shape opened at one side, and a second bracket 1163 formed in an open ring shape and joined to the fixing part 1162 of the first bracket 1161.

In this instance, since the fixing part 1162 of the first bracket 1162 and the inner peripheral surface of the second bracket 1163 are in contact with the outer peripheral surface of the side flange body 1141 of the side flange 114 and a roller (not shown) and the main bracket 120 is connected with the driving module 120 to keep the fixed state without rotation, the main bracket 116 absorbs shock generated when the rotation of the escalator rotary shaft 500 stops.

The driving module 120 includes: the stopper part 121 which is caught to the ratchet wheel 111 to limit the rotation of the ratchet gear module 110; a driving part 122 connected between the stopper part 121 and the solenoid part 130; and a supporter part 123 mounted on the escalator support frame 700 previously mounted in the escalator to fix and support the conventional art 100.

The stopper part 121 includes: a pawl 1211 which is rotatably joined to the front end portion of the driving part 122 and has a front end portion which is caught to the ratchet wheel 111 by the driving part 122 at the time of overspeed and reverse drive of the escalator so as to limit the rotation of the ratchet gear module 110; a connector 1212 protruding on the upper portion of the pawl 1211 so that the pawl 1211 can be connected to the driving part 122; a pawl shaft 1213 penetrating through the center of the pawl 1211 to rotate the pawl 1211.

The driving part 122 is formed in a circular bar shape, and has an end portion connected with the connector 1212 and the other end portion connected with the solenoid part 130.

In this instance, the driving part 122 moves forwards or backwards by the solenoid part 130 to rotate the stopper part 121, so that the pawl 1211 of the stopper part 121 is caught to the ratchet wheel 111 so as to limit the rotation of the ratchet gear module 110.

The supporter part 123 is connected to the escalator support frame 700, which is previously mounted, so as to fix and support the conventional art 100, and includes a first support frame 1231 and a second support frame 1235.

The first support frame 1231 includes a front plate 1232 coupled with the main bracket 116, a rear plate 1233 fixed to the front of the escalator support frame 700, and a connection piece 1234 for connecting the front plate 1232 and the rear plate 122 with each other. The first support frame 1231 supports the ratchet gear module 110 and the driving module 120.

The second support frame 1235 is mounted at the rear of the first support frame 1231 and the escalator support frame 700, and supports the solenoid part 130.

In this instance, the front plate 1232, the rear plate 1233, and the escalator support frame 700 respectively have elongated holes formed in the middle thereof so that the driving part 122 of the driving module 120 is inserted into the elongated holes.

In the conventional art 100, when reverse rotation of the escalator rotary shaft 500 is sensed by the reverse rotation sensing unit, the driving part 122 of the driving module 120 is moved forwards by the solenoid part 130. Then, the pawl 1211 of the stopper part 121 rotates around the pawl shaft 1213 and an end portion of the pawl 1211 is caught to the ratchet wheel 111 so as to limit the rotation of the ratchet wheel 111 and prevent reverse drive of the escalator.

However, in case of the conventional art 100, because the length of the driving part 122 is not varied and the distance that the driving part 122 is capable of moving forwards from the solenoid part 130 is limited, if the distance that the driving part 122 is capable of moving forwards is reduced due to an installation error and malfunction of the solenoid part 130, a rotational angle of the pawl 1211 which is connected with the driving part 122 to do a circular motion is reduced and just a portion of the pawl 1211 is inserted between gears of the ratchet wheel 111, thereby reducing braking power since a contact area is reduced.

Furthermore, the conventional art 100 increases installation time and decreases intensity of the escalator support frame 700 since the supporter part 123 is mounted by being inserted into a through hole (not shown) bored in the escalator support frame 700. So, the escalator support frame 700 may be damaged by shock generated while the reverse drive of the escalator is prevented.

Additionally, the conventional art 100 increases installation time and costs and decreases intensity of the escalator rotary shaft 500 since a fixing hole (not shown) is formed in the escalator rotary shaft 500 to fix the side flange 114 mounted on the escalator rotary shaft 500. So, the escalator rotary shaft 500 may be damaged.

In addition, in case of the conventional art 100, when the pawl 1211 is inserted into the ratchet wheel 111, the brake linings 113 and 113' apply friction force to the outer surface of the ratchet fixing flange 112 coupled with the ratchet wheel 111 so as to stop the rotation of the ratchet wheel 111, thereby stopping the rotation of the escalator rotary shaft 500. However, if the floor height gets higher and a load applied to the escalator is increased, it is difficult to secure sufficient braking power just by the friction force of the brake linings 113 and 113', and the conventional art 100 may lose the function of preventing overspeed and reverse drive of the escalator.

SUMMARY OF THE INVENTION

Accordingly, the present invention has been made to solve the above-mentioned problems occurring in the prior arts, and it is an object of the present invention to provide an overspeed and reverse drive preventing device, which includes a tension spring mounted between a pawl and a connection part that rotates the pawl by operation of a driving part so that the tension spring is extended even though a rotational angle of a pawl is limited due to an installation error and the pawl is completely inserted into a ratchet.

It is another object of the present invention to provide an overspeed and reverse drive preventing device, which includes a braking member mounted on the inner peripheral surface of a brake arm mounted on the outer face of a ratchet part or a rotary shaft or mounted on the outer peripheral surface of a device facing the brake arm to provide additional braking power to an escalator rotary shaft, thereby preventing a damage of a brake lining mounted on the ratchet part and preventing overspeed and reverse rotation of the escalator even though not showing braking power properly due to a damage of the brake lining. Moreover, the overspeed and reverse drive preventing device according to the present invention can increase braking power applied to the escalator rotary shaft since having the braking member mounted on the inner peripheral surface of the device facing the rotary shaft or on the outer peripheral surface of the rotary shaft.

It is a further object of the present invention to provide an overspeed and reverse drive preventing device, which can reduce work time since being installed even though the escalator rotary shaft and a support frame are not perforated and can prevent the escalator rotary shaft and the support frame from being deteriorated in durability due to perforation.

It is a still further object of the present invention to provide an overspeed and reverse drive preventing device, which includes a spring member disposed to connect a connection part for rotating the pawl by operation of the driving part so that the length of the connection part is varied by the spring and the pawl can be perfectly inserted into the ratchet even though the rotational angle or length of the pawl is limited due to the installation error.

It is another object of the present invention to provide an overspeed and reverse drive preventing device, which includes a ball joint disposed to connect the connection part for rotating the pawl by operation of the driving part so that the length of the connection part is varied by the ball joint and the pawl can be perfectly inserted into the ratchet even though the rotational angle or length of the pawl is limited due to the installation error.

Objects of the present invention are not limited to the objects described above, and other objects that are not described will be clearly understood by a person skilled in the art from the description below.

To accomplish the above object, according to the present invention, there is provided an overspeed and reverse drive preventing device including: a ratchet part including a ratchet wheel rotatably mounted on an escalator rotary shaft, and friction parts mounted at both sides of the ratchet wheel to be in frictional contact with the ratchet wheel and coupled with the rotary shaft to be rotated together with the rotary shaft; a detection sensor for sensing rotation of the rotary shaft; a support frame which is a structure installed inside the escalator to support another object; a support part mounted on the support frame; and a rotation limiting part mounted on the support part in order to limit the rotation of the ratchet wheel when a retaining part is inserted into the ratchet wheel, wherein the support part includes: a supporter coupled with the support frame; and a frictionally movable body of which one side is coupled with the supporter and which is mounted to be spaced apart from the ratchet part. When the detection sensor senses overspeed or reverse rotation of the rotary shaft, the retaining part of the rotation limiting part is inserted into the ratchet wheel and is pressed by rotational force of the ratchet wheel to move the frictionally movable body rearwards, so that the frictionally movable body comes into contact with the outer peripheral surface of the ratchet part so as to generate friction.

Moreover, in another aspect of the present invention, there is provided an overspeed and reverse drive preventing device for an escalator including: a ratchet part including a ratchet wheel rotatably mounted on an escalator rotary shaft, and friction parts mounted at both sides of the ratchet wheel to be in frictional contact with the ratchet wheel and coupled with the rotary shaft to be rotated together with the rotary shaft; a detection sensor for sensing rotation of the rotary shaft; a support frame which is a structure installed inside the escalator to support another object; a support part mounted on the support frame; and a rotation limiting part mounted on the support part in order to limit the rotation of the ratchet wheel when a retaining part is inserted into the ratchet wheel, wherein the support part includes: a supporter coupled with the support frame; and a frictionally movable body of which one side is coupled with the supporter and which is mounted to be spaced apart from the rotary shaft. When the detection sensor senses overspeed or reverse rotation of the rotary shaft, the retaining part of the rotation limiting part is inserted into the ratchet wheel and is pressed by rotational force of the ratchet wheel to move the frictionally movable body rearwards, so that the frictionally movable body comes into contact with the outer peripheral surface of the ratchet part so as to generate friction.

Furthermore, the frictionally movable body includes: brake arms which have a space formed therein, into which the rotary shaft is inserted, and which are mounted to be spaced apart from the rotary shaft; and pawl supports which are respectively coupled with the brake arms, and, on which the rotation limiting part is mounted.

Additionally, braking members for generating braking power during friction are mounted on any one among the inner peripheral surfaces of the brake arms, outer peripheral surface of the friction part, and the outer peripheral surface of the rotary shaft.

In addition, the ratchet part further includes a pair of discs which are formed in a hollow disc shape and are respectively coupled to right and left sides of the ratchet wheel. The friction part includes: brake parts which are formed in a hollow disc shape and respectively get in contact with the outer surfaces of the discs by the braking members mounted on the inner surface thereof; and stoppers which are formed in a hollow cylindrical shape, are mounted on the outer faces of the brake parts, and are coupled with the brake parts by pressing bolts. The stoppers are coupled with the escalator rotary shaft to be rotated together when fastening bolts are fastened to fastening bolt holes formed from the outer peripheral surface to the inner peripheral surface to communicate with the inner face and end portions of the fastening bolts press the rotary shaft, and the brake parts are pressed by the pressing bolts respectively coupled with the stoppers so as to get in close contact with the discs.

Moreover, the rotation limiting part includes: a pawl rotatably which is mounted on the pawl support and of which one end portion is inserted into the ratchet wheel at the time of rotation; a connection part connected with the pawl; and a driving part which operates the connection part to rotate the pawl. The connection part includes: a tension spring of which one end portion is connected with the pawl; a connection bar of which one end portion is connected with the other end portion of the tension spring; a connection plate which is formed in a plate shape and which is coupled with the other end portion of the connection bar; and a driving bar of which both end portions are respectively coupled to the connection plate and the driving part. When the pawl is inserted into the ratchet part, the connection part is extended so that the pawl is perfectly inserted into the ratchet part.

In a further aspect of the present invention, there is provided an overspeed and reverse drive preventing device for an escalator including: a ratchet part including a ratchet wheel rotatably mounted on an escalator rotary shaft, and friction parts mounted at both sides of the ratchet wheel to be in frictional contact with the ratchet wheel and coupled with the rotary shaft to be rotated together with the rotary shaft; a detection sensor for sensing rotation of the rotary shaft; a support frame which is a structure installed inside the escalator to support another object; a support part mounted on the support frame to support the ratchet part; and a rotation limiting part mounted on the support part in order to limit the rotation of the ratchet wheel when a retaining part is inserted into the ratchet wheel. The rotation limiting part includes: a pawl rotatably mounted on the support part; a connection part of which one end portion is coupled with the pawl; and a driving part with which the other end portion of the connection part is coupled, and, which moves the connection part forwards when the detection sensor senses overspeed or reverse rotation. The connection part includes: an extension part of which one end portion is connected with the pawl; a connection bar of which one end portion is connected with the other end portion of the extension part; a connection plate with which the other end portion of the connection bar is coupled; and a driving bar of which both end portions are respectively coupled to the connection plate and the driving part. The extension part extends the connection part so that the pawl is perfectly inserted into the ratchet wheel when the pawl is inserted into the ratchet wheel.

Additionally, the extension part is a tension spring, and both end portions of the extension part are respectively coupled to the pawl and the connection bar.

In addition, the connection bar has a ball joint formed at one end portion thereof, and the extension part is a rotational connection bar, and has one end portion connected with the pawl and the other end portion rotatably connected with the connection bar by the ball joint.

Moreover, the support part includes: a pair of main brackets respectively mounted on the outer peripheral surfaces of the stoppers to get in contact with the outer peripheral surfaces of the stoppers; a fixed bracket mounted at the escalator support frame to be caught; connection bolts for connecting the main brackets and the fixed bracket with each other; and nuts fastened to the connection bolts. The support part is coupled with the escalator main brackets when end portions of the connection bolts press the escalator main brackets.

According to the overspeed and reverse drive preventing device according to an embodiment of the present invention, because the pawl and the connection part are connected by the tension spring, if the pawl is pressed by the ratchet when the pawl is inserted into the ratchet gears, the tension spring is extended so that the pawl is perfectly inserted into the ratchet. Therefore, the overspeed and reverse drive preventing device according to an embodiment of the present invention can be applied to escalators with various sizes.

Furthermore, the overspeed and reverse drive preventing device according to an embodiment of the present invention can prevent a damage of the brake lining mounted on the ratchet part and prevent overspeed and reverse rotation of the escalator even though not showing braking power properly due to a damage of the brake lining, since the braking member is mounted on the inner peripheral surface of the brake arm mounted on the outer face of the ratchet part or the rotary shaft or mounted on the outer peripheral surface of a device facing the brake arm to provide additional braking power to an escalator rotary shaft.

Additionally, the overspeed and reverse drive preventing device according to an embodiment of the present invention can prevent a damage of the brake lining mounted on the ratchet part and prevent overspeed and reverse rotation of the escalator even though not showing braking power properly due to a damage of the brake lining, since the braking member is mounted on the inner peripheral surface of the device facing the rotary shaft or on the outer peripheral surface of the rotary shaft to provide additional braking power to an escalator rotary shaft.

In addition, the overspeed and reverse drive preventing device according to an embodiment of the present invention can reduce installation costs and an installation period of time and prevent deterioration in durability caused by perforation since the escalator rotary shaft and the escalator support frame do not need additional perforation work.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION OF THE INVENTION

Hereinafter, preferred embodiments of the present invention will be described in detail with reference to the accompanying drawings.

Figure 3:
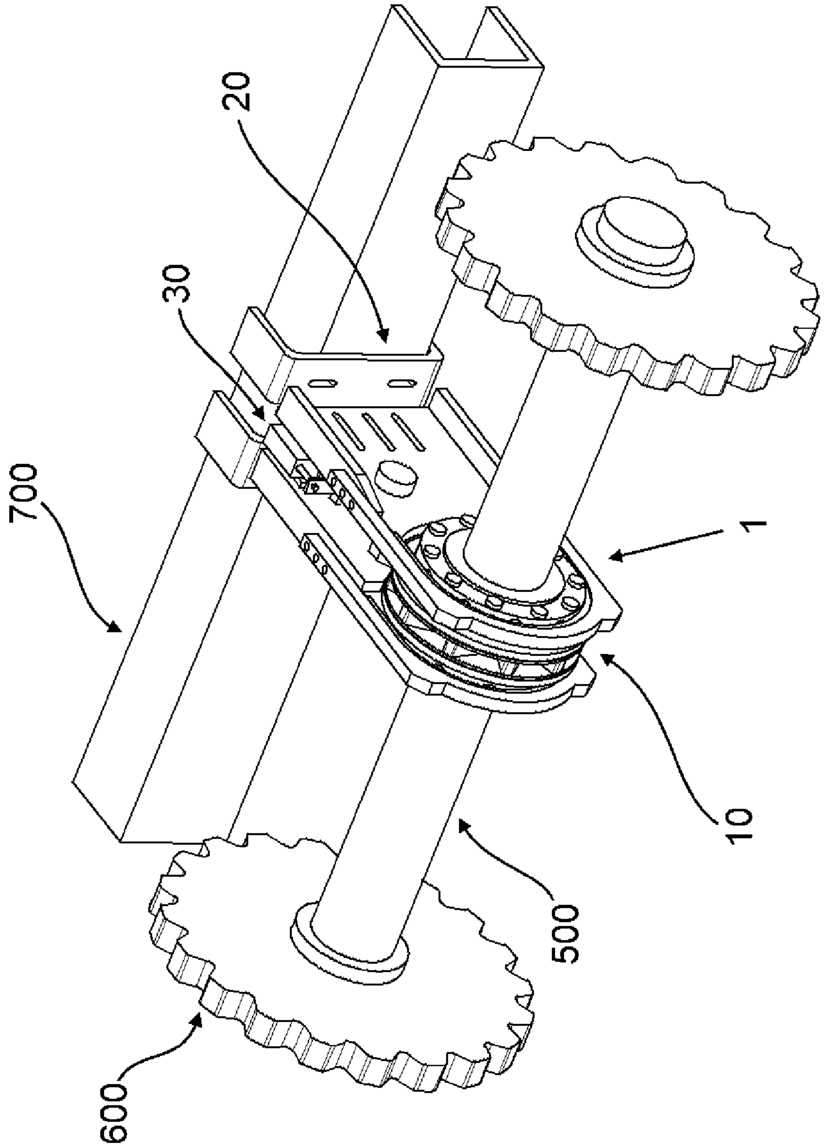
FIG. 3 is a perspective view illustrating an overspeed and reverse drive preventing device according to a first preferred embodiment of the present invention.
Figure 4:
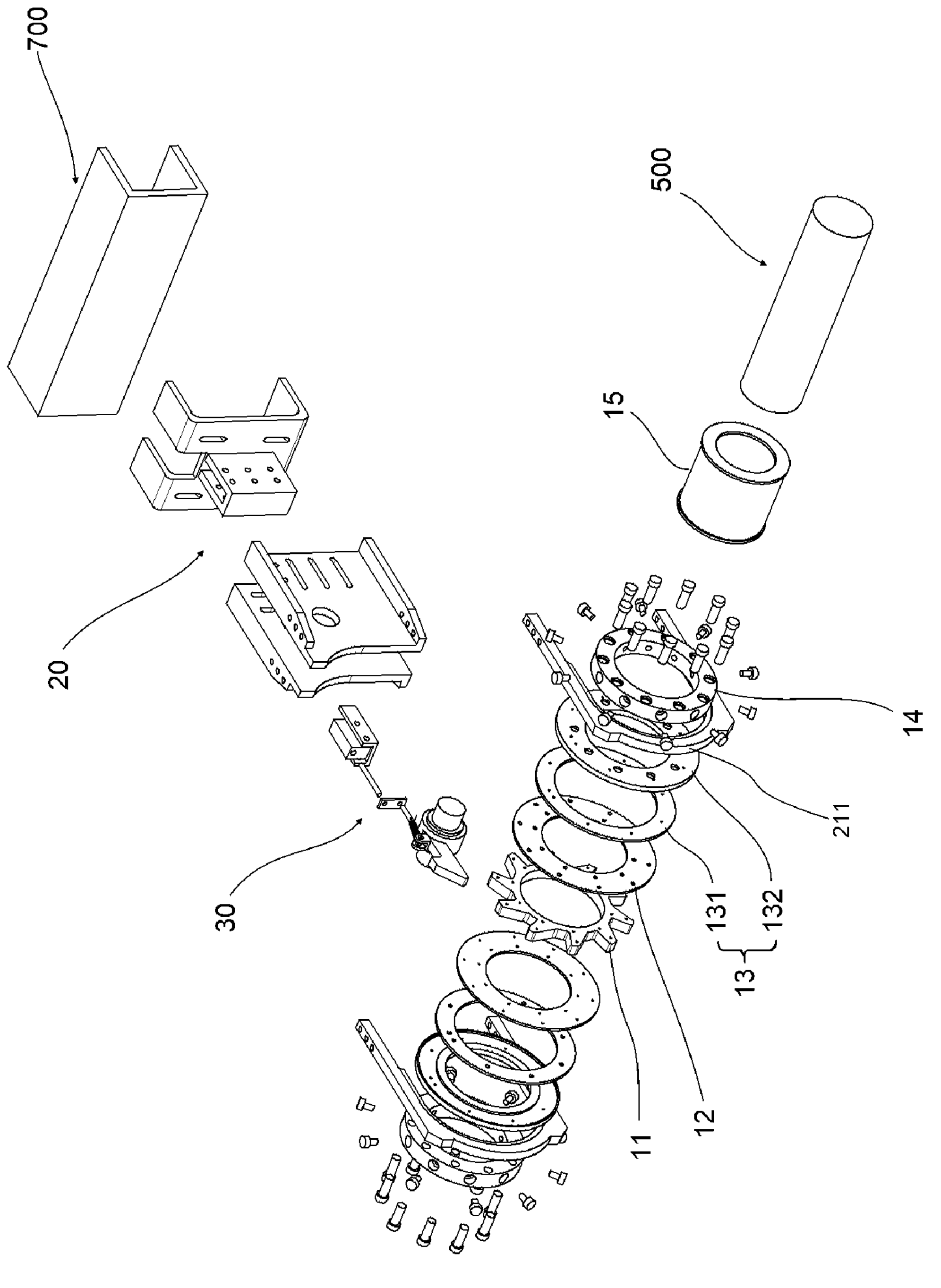
FIG. 4 is an exploded perspective view of FIG. 3.

FIG. 3 is a perspective view illustrating an overspeed and reverse drive preventing device according to a first preferred embodiment of the present invention, and FIG. 4 is an exploded perspective view of FIG. 3.

As illustrated in FIG. 3, the overspeed and reverse drive preventing device 1 for an escalator is installed on an escalator rotary shaft 500, on which driving sprockets 600 which are driving means for an escalator are mounted, and on an escalator support frame 700 which is an internal structure of the escalator to support other objects.

For convenience of explanation, a direction facing the rotary shaft 500 from the escalator support frame 700 is defined as the front, and a direction facing the escalator support frame 700 from the rotary shaft 500 is defined as the rear.

As illustrated in FIGS. 3 and 4, the overspeed and reverse drive preventing device 1 for an escalator 1 includes: a ratchet part 10 mounted on the rotary shaft 500; a support part 20 mounted on the escalator support frame 700; and a rotation limiting part 30 mounted on the support part 20 in order to limit rotation of the ratchet part 10 by being inserted into the ratchet part 10 when necessary.

Moreover, a detection sensor (not shown) for sensing reverse rotation or overspeed of the escalator rotary shaft 500 is mounted at one side of the driving sprocket 600 of the escalator. The detection sensor outputs a sensing signal to the rotation limiting part 30 when reverse rotation or overspeed of the escalator rotary shaft 500 is sensed.

In this instance, constituent elements of the ratchet part 10 are divided into two pieces forming a semicircular shape. The divided semicircular pieces respectively have semicircular grooves formed on the inner faces thereof so as to be easily coupled with each other using a coupling means, such as a bolt, without separation of the escalator rotary shaft 500.

Figure 5:
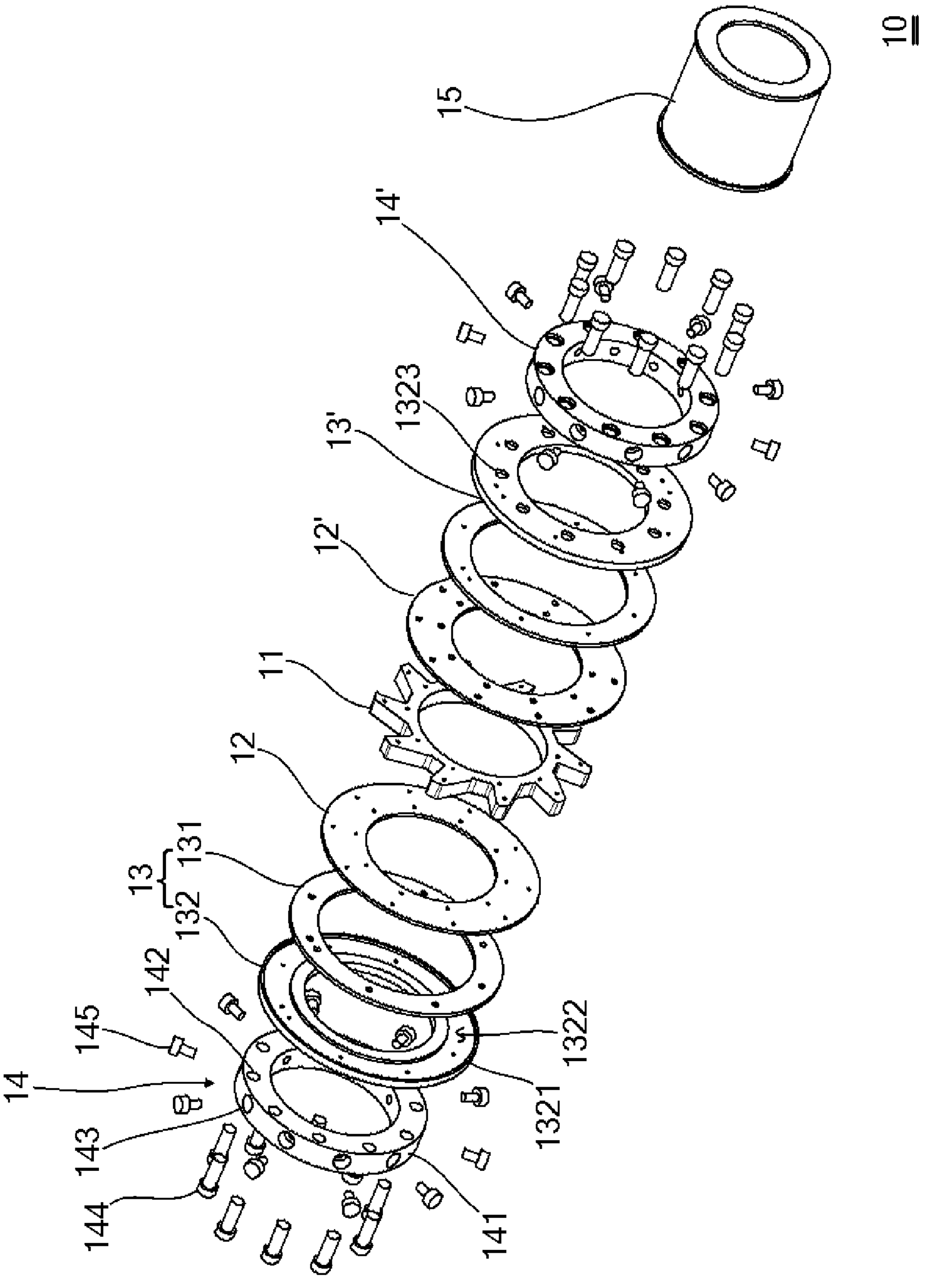
FIG. 5 is an exploded perspective view of a ratchet part of FIG. 3.

FIG. 5 is an exploded perspective view of a ratchet part of FIG. 3.

The ratchet part 10 includes: a ratchet wheel 11 rotatably mounted on the escalator rotary shaft 500; discs 12 and 12' formed in a hollow disc shape and respectively coupled to both sides of the ratchet wheel 11; brake parts 13 and 13' respectively getting in contact with outer surfaces of the discs 12 and 12'; stoppers 14 and 14' respectively mounted on outer faces of the brake parts 13 and 13' to be spaced apart from each other; and a base mounted between the outer peripheral surface of the escalator rotary shaft 500 and inner peripheral surfaces of the ratchet wheel 11, the discs 12, the brake parts 13 and the stoppers 14.

The ratchet wheel 11 has saw-toothed gears formed on the outer face thereof, and a shaft insertion hole formed therein. The inner peripheral surface of the ratchet wheel 11 gets in contact with the outer peripheral surface of the base 15.

In this instance, the ratchet wheel 11 rotates separately from the base 15 since not being coupled with the base 15.

The discs 12 and 12' are formed in a hollow disc shape, and are joined to both sides of the ratchet wheel 1 by bolt-joint so as to be rotated integrally with the ratchet wheel 11.

The brake parts 13 and 13' are mounted at both sides of the discs 12 and 12', and each of the brake parts 13 and 13' includes a brake lining 131 and a lining cover 132.

The brake lining 131 is formed in a hollow disc shape, and is made of a material with a high coefficient of friction.

A lining cover 132 includes a cover body 1321 of a hollow disc shape, an insertion groove 1322 into which the brake lining 131 is inserted, and pressing bolt holes 1323 formed in the outer surface of the cover body 1321 so that pressing bolts 144 are respectively fastened.

In this instance, the brake lining 131 is inserted into the insertion groove 1322 of the lining cover 132, is coupled with the lining cover 132 by bolts being jointed, and protrudes from the lining cover 132 since being thicker than the insertion groove 1322.

Furthermore, the brake lining 131 generates friction since the part protruding from the lining cover 132 gets in contact with the outer surfaces of the discs 12 and 12'.

The stopper 14 includes: a stopper body 141 of a hollow cylindrical shape; pressing bolt coupling grooves 142 formed at regular intervals while drawing a circular route at both sides of the stopper body 141; and fastening bolt holes 143 formed in the outer peripheral surface of the stopper body 141 at regular intervals to communicate with the inner peripheral surface of the stopper body 141.

In this instance, the pressing bolt coupling grooves 142 are formed at positions corresponding to the pressing bolt holes 1323 of the lining cover 132, and the lining cover 132 and the stopper 14 are coupled with each other by the pressing bolts 144 joined to the pressing bolt coupling grooves 142 and the pressing bolt holes 1323.

In this instance, the pressing bolts 144 apply pressing power into the brake part 13 so that the brake lining 131 gets in contact with the disc 12 and friction force between the brake lining 131 and the disc 12 is varied according strength of pressing power.

Moreover, fastening bolts 145 of the stoppers 14 and 14' are coupled to the fastening bolt holes 143 and end portions of the fastening bolts 145 press the outer peripheral surface of a base 15 and the rotary shaft 500 so that the base 15 and the stoppers 14 and 14' are rotated together with the escalator rotary shaft 500 by pressing power.

In this instance, because the brake part 13 is coupled with the stoppers 14 and 14' by the pressing bolts 144, the brake part 13, the stoppers 14 and 14', and the rotary shaft 500 are rotated together.

Furthermore, the stoppers 14 and 14' are coupled with the rotary shaft 500 by pressing the outer peripheral surface of the escalator rotary shaft 500 so as to be mounted on the escalator rotary shaft 500 with no perforation work.

The base 15 is formed in a hollow cylindrical shape, and has the inner peripheral surface getting in contact with the outer peripheral surface of the escalator rotary shaft 500 and the outer peripheral surface getting in contact with the inner peripheral surfaces of the ratchet wheel 11, the discs 12, the brake parts 13, and the stoppers 14.

The base 15 prevents the inner peripheral surfaces of the ratchet wheel 11, the discs 12, the brake parts 13, and the stoppers 14 from directly getting in contact with the outer peripheral surface of the escalator rotary shaft 500 and being worn by friction.

In this instance, preferably, the base 15 is made of a material with elasticity and wear resistance.

The ratchet wheel 11 and the discs 12 and 12' of the ratchet part 10 are usually rotated in the same direction as the rotary shaft 500 by friction force between the ratchet part 10 and the brake lining 131, but if overspeed or reverse rotation of the rotary shaft 500 occurs, a pawl 31 of the rotation limiting part 30 is inserted between the gears of the ratchet wheel 11 by the rotation limiting part 30 in order to limit the rotation of the ratchet wheel 11 and the discs 12.

In this instance, the discs 12 and the brake parts 13 are in frictional contact by the brake lining 131 so that friction force is applied to the brake part 13 in the reverse direction to the rotational direction of the rotary shaft 500.

Additionally, because the brake parts 13, the stoppers 14 and the rotary shaft 500 are coupled with one another, a rotational speed of the rotary shaft 500 gets gradually reduced by the friction force acting to the brake part 13 and the rotation of the escalator rotary shaft 500 stops.

In addition, because the stoppers 14 of the ratchet part 10 are fixed with the escalator rotary shaft 500 by pressing power of the fastening bolts 145 without forming a fixing hole in the escalator rotary shaft 500, the present invention can reduce installation time and prevent that intensity of the rotary shaft 500 is reduced by the fixing hole.

Figure 6:
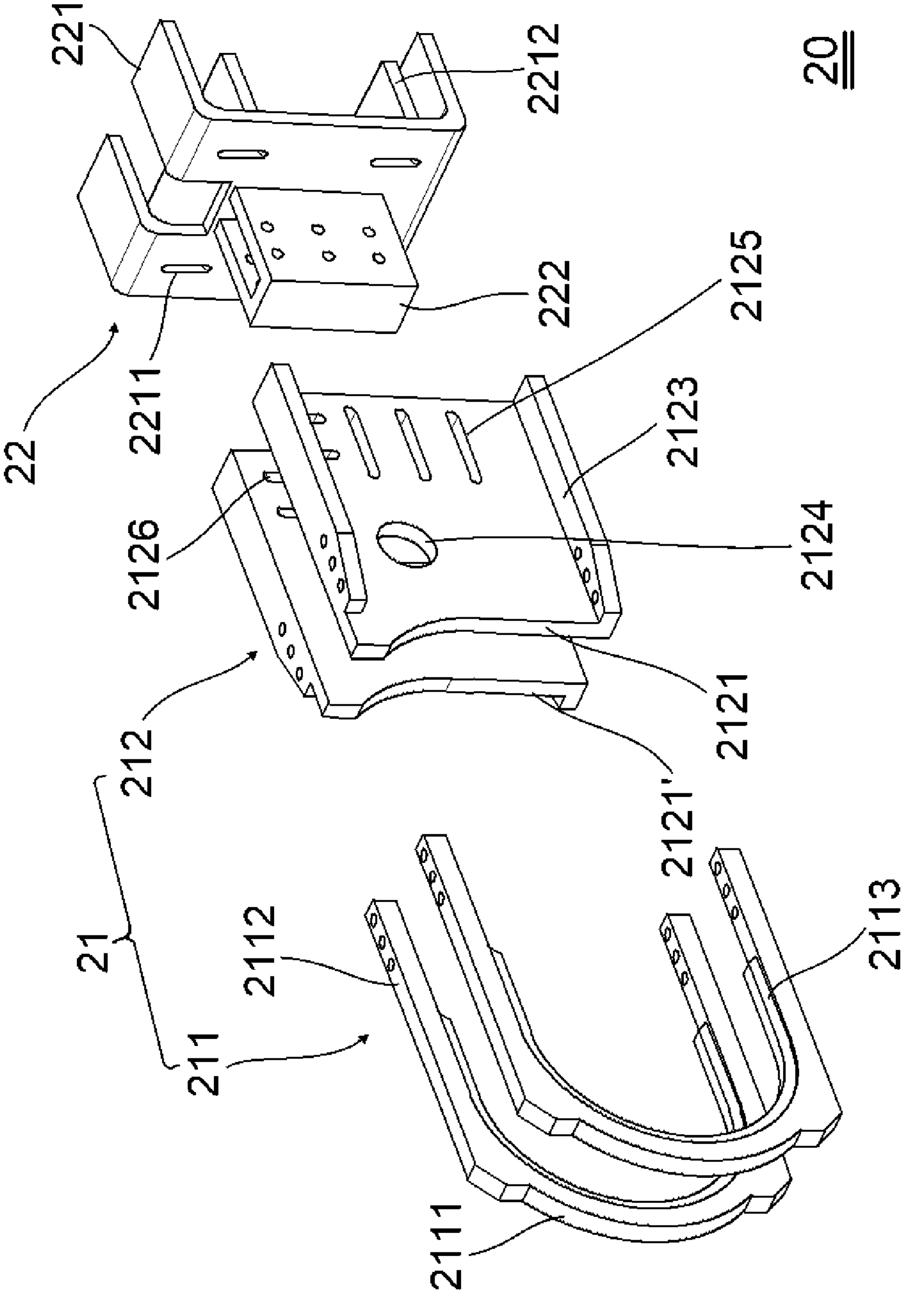
FIG. 6 is an exploded perspective view of a support part of FIG. 3.
Figure 7:
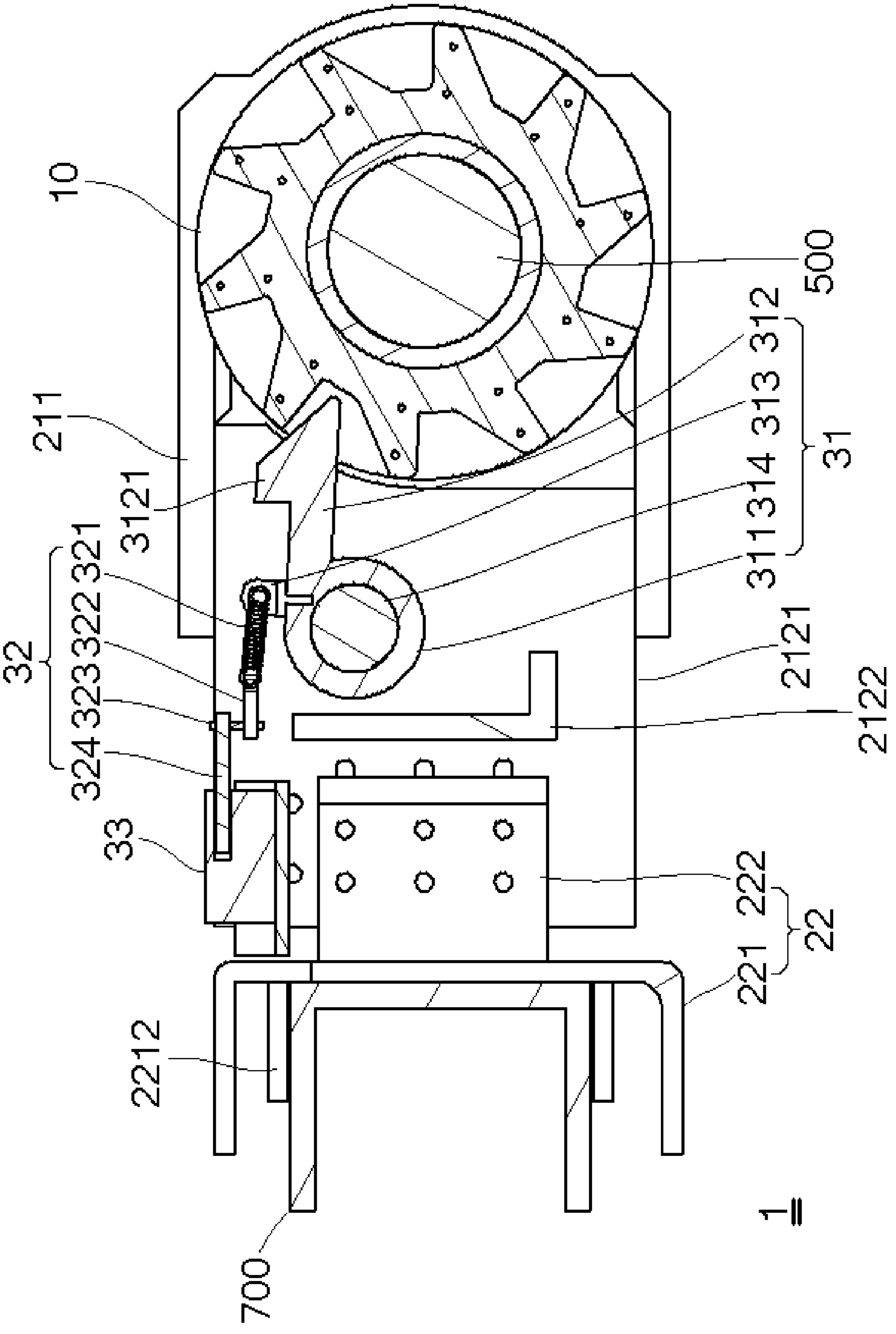
FIG. 7 is a sectional view of FIG. 3.

FIG. 6 is an exploded perspective view of a support part of FIG. 3, and FIG. 7 is a sectional view of FIG. 3.

The support part 20 includes a frictionally movable body 21, and a supporter 22 mounted at the rear of the frictionally movable body 21 to be coupled with the escalator support frame 700.

Moreover, the frictionally movable body 21 includes brake arms 211 which are formed in a "⊂" shape, and pawl supports 212 which are respectively coupled with end portions of the brake arms 211 and on which the rotation limiting part 30 is mounted.

Each of the brake arms 211 includes a curved part 2111 of a semicircular ring shape, extension parts 2112 extending from both end portions of the curved part 2111 in parallel, and a braking member 2113 mounted on the inner peripheral surfaces of the curved part 2111 and the extension part 2112.

In this instance, for convenience of explanation, it is illustrated that the braking member 2113 is mounted on the inner peripheral surfaces of the curved part 2111 and the extension part 2112, but the braking member 2113 is not limited to the above in installation position and form and may be mounted on the outer peripheral surface of the stopper 14.

Furthermore, the diameter of the inner peripheral surface of the curved part 2111 is larger than the diameter of the outer peripheral surface of the stopper 14.

Additionally, the diameter of the inner peripheral surface of the braking member 2113 mounted on the inner peripheral surfaces of the curved part 2111 and the extension part 2112 is also larger than the diameter of the outer peripheral surface of the stopper 14.

In addition, rear end portions of the extension parts 2112 are coupled with the pawl supports 212 by bolt coupling. In this instance, the stoppers 14 are respectively located inside the brake arms 211.

The pawl supports 212 and 212' respectively include a pair of flat plates 2121 and 2121' mounted to be spaced apart from each other and connection plates 2122 for connecting the flat plates 2121 and 2121'.

The flat plates 2121 and 2121' respectively have flanges 2123 respectively extending outwards from upper and lower end portions thereof, and the flanges 2123 respectively have bolt holes formed at the front thereof to penetrate upper and lower surfaces thereof so as to be coupled with the brake arms 211 by bolt coupling.

Moreover, the flat plates 2121 and 2121' respectively have insertion holes 2124 formed to insert the rotation limiting part 30 thereinto.

Furthermore, the flat plates 2121 and 2121' respectively have first bolt insertion holes 2125 formed at the rear of the insertion holes 2124 so that bolts (not shown) are inserted into the first bolt insertion holes 2125.

The first bolt insertion holes 2125 are elongated holes formed in the horizontal direction, and a plurality of the first bolt insertion holes 2125 are formed in the vertical direction.

Because the pawl supports 212 are coupled with the supporter 22 by the bolts inserted into the first bolt insertion holes 2125 and the first bolt insertion holes 2125 are horizontally elongated holes, the installation position of the supporter 22 can be adjusted in the back-and-forth direction.

Therefore, the support part 20 can be installed in one of escalators, which have different distances between the escalator rotary shaft 500 and the support frame 700, without welding work by changing the mounting position of the supporter 22 mounted on the pawl support 212.

Additionally, the flat plates 2121 and 2121' respectively have second bolt insertion holes 2126 formed above the first bolt insertion holes 2125.

The second bolt insertion holes 2126 are elongated holes formed vertically, and a plurality of the second bolt insertion holes 2126 are formed in the horizontal direction.

The pawl supports 212 are coupled with the driving part 33 by the bolts inserted into the second bolt insertion holes 2126, and can vertically adjust the installation position of the driving part 33 since the second bolt insertion holes 2126 are elongated holes formed in the vertical direction.

The supporter 22 includes a contact body 221 coupled with the support frame 700, and a protrusion body 222 protruding forwards from the contact body 221.

The contact body 221 is formed in a "⊏" shape, and has an opening part formed at the upper portion so that the rear end portion of the driving part 33 can be inserted.

Moreover, the contact body 221 has a plurality of third bolt insertion holes 2211 formed in the vertical direction.

Support plates 2212 of a flat plate shape are coupled to the third bolt insertion holes 2211 of the contact body 221 by bolt coupling.

In this instance, the support plates 2212 can vertically adjust the installation positions of the support plates 2212 since the third bolt insertion holes 2211 are elongated holes formed in the vertical direction.

The support plates 2212 can be adjusted in position so as to get in contact with upper and lower surfaces of the support frames which are different in height in every escalator.

The protrusion body 222 has a plurality of bolt holes penetrating both sides thereof.

The protrusion body 222 is inserted into the flat plates 2121 and 2121' of the pawl support 212, and is coupled with the pawl support 212 by the bolts inserted into the first bolt insertion holes 2125.

In this instance, the first bolt insertion holes 2125 formed in the pawl support 212 can adjust the installation position of the supporter 22 in the back-and-forth direction since being elongated holes formed in the horizontal direction.

The support part 20 does not require additional cost or time when being installed in one of escalators having different sizes since being capable of adjusting positions of contact parts of the supporter 22 which comes into contact with the escalator support frame 700 through the first bolt insertion holes 2125 and the third bolt insertion holes 2211.

Furthermore, the support part 20 can be mounted without performing perforation work on the escalator support frame 700 since getting in contact with the escalator support frame 700 by the contact body 221 of the supporter 22. Therefore, the support part 20 can save work expenses and work time and prevent intensity of the support frame 700 from being reduced by perforation work.

Additionally, the frictionally movable body 21 of the support part 20 is moved forwards or backwards if power exceeding fastening power of the bolts is applied since the frictionally movable body 21 and the supporter 22 are coupled by the bolts inserted into the first bolt insertion holes 2125.

The support part 20 moves backwards since the frictionally movable body 21 is pressed by rotational force of the ratchet wheel 11 applied to the rotation limiting part 30 when the rotation of the ratchet wheel 11 is limited by the rotation limiting part 30.

In this instance, the brake arms 211 mounted at the front of the frictionally movable body 21 apply friction force to the stoppers 14 since the braking members 2113 mounted on the inner peripheral surfaces of the brake arms 211 get in contact with the outer peripheral surfaces of the stoppers 14, so that braking power applied to the escalator rotary shaft 500 is increased.

As illustrated in FIG. 7, the rotation limiting part 30 includes the pawl 31 inserted between the gears of the ratchet wheel 11 to limit the rotation of the ratchet wheel 11, the connection part 32 for connecting the pawl 31 and the driving part 33 with each other, and the driving part 33 which moves the connection part 32 to rotate the pawl 31.

The pawl 31 includes a pawl body 311 of a hollow cylindrical shape, a retaining part 312 protruding from the outer peripheral surface of the pawl body 311, and a connector 313 rotatably mounted on the pawl body 311 or the retaining part 312 and joined to the connection part 32 by a hinge.

Moreover, the pawl 31 is rotatably coupled with the pawl support 212 since the pawl shaft 314 is perforated into the pawl body 311 and the pawl shaft 314 is inserted and joined into the insertion hole 2124 of the pawl support 212.

In this instance, because the protrusion part 3121 is formed at the end portion of the retaining part 312, weight of the end portion is increased. Therefore, as weight is increased, the speed that the retaining part 312 is inserted between the gears of the ratchet wheel 11 is increased.

Furthermore, because the pawl 31 is mounted to be rotated only within a range of a predetermined angle, it is prevented that the pawl 31 gets out of the gears due to overspeed rotation when being inserted between the gears of the ratchet wheel 11.

The connection part 32 includes: a tension spring 321 of which one end portion is hinge-coupled with the connector 313 of the pawl 31; a connection bar 322 of which one end portion is connected with the other end portion of the tension spring 321; a connection plate 323 which is formed in a long plate shape and with which the other end portion of the connection bar 322 is coupled vertically; and a driving bar 324 of which both end portions are respectively coupled to the connection plate 323 and the driving part 33.

In this instance, the connection plate 323 is coupled with the connection bar 322 and the driving bar 324 by means of nuts (not shown). When coupling positions of the nuts are adjusted, a distance of the connection part 32 can be adjusted according to a distance between the escalator rotary shaft 500 and the support frame 700.

The driving part 33 is mounted on the pawl support 212, and moves the driving bar 324 of the connection part 32 forwards when the detection sensor senses overspeed or reverse rotation.

Figure 8A:
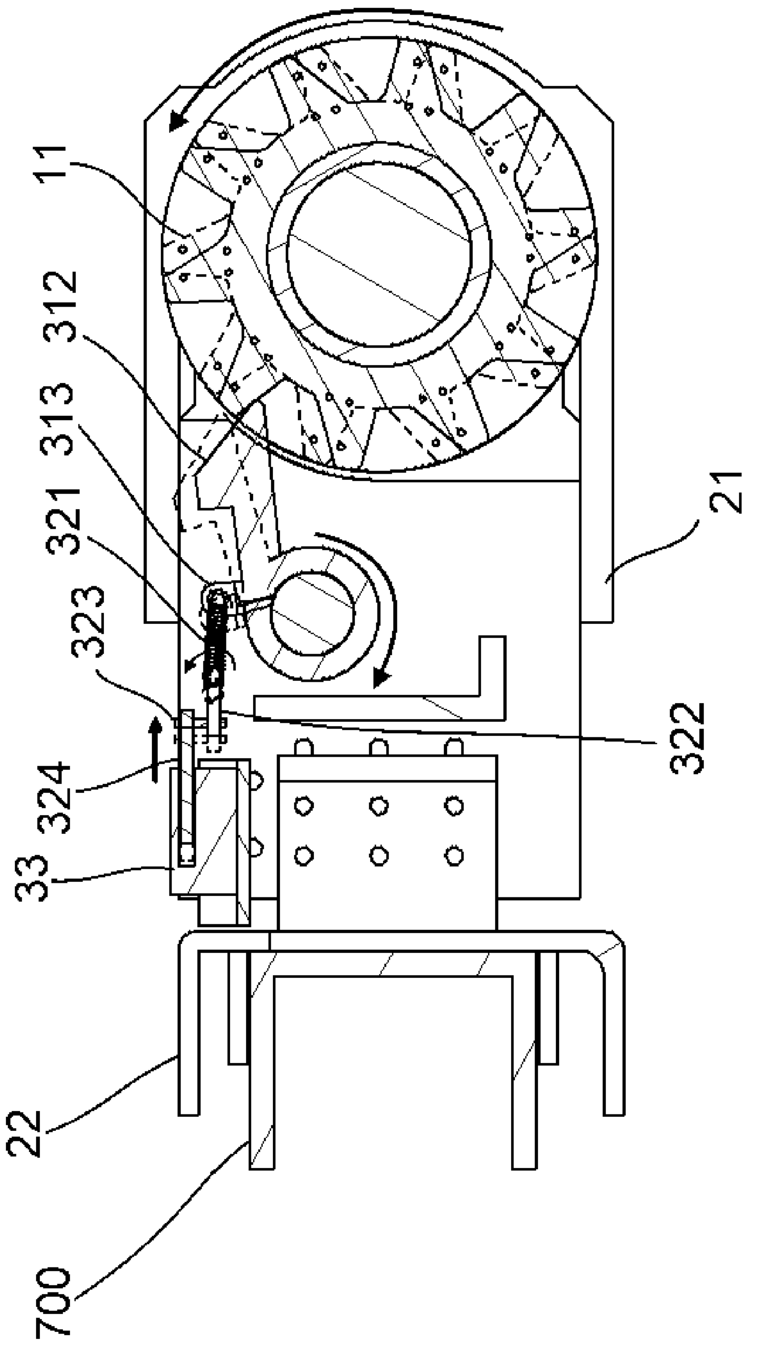
FIGS. 8A and 8B are sectional views illustrating an operational process of a rotation limiting part of FIG. 7.
Figure 8B:
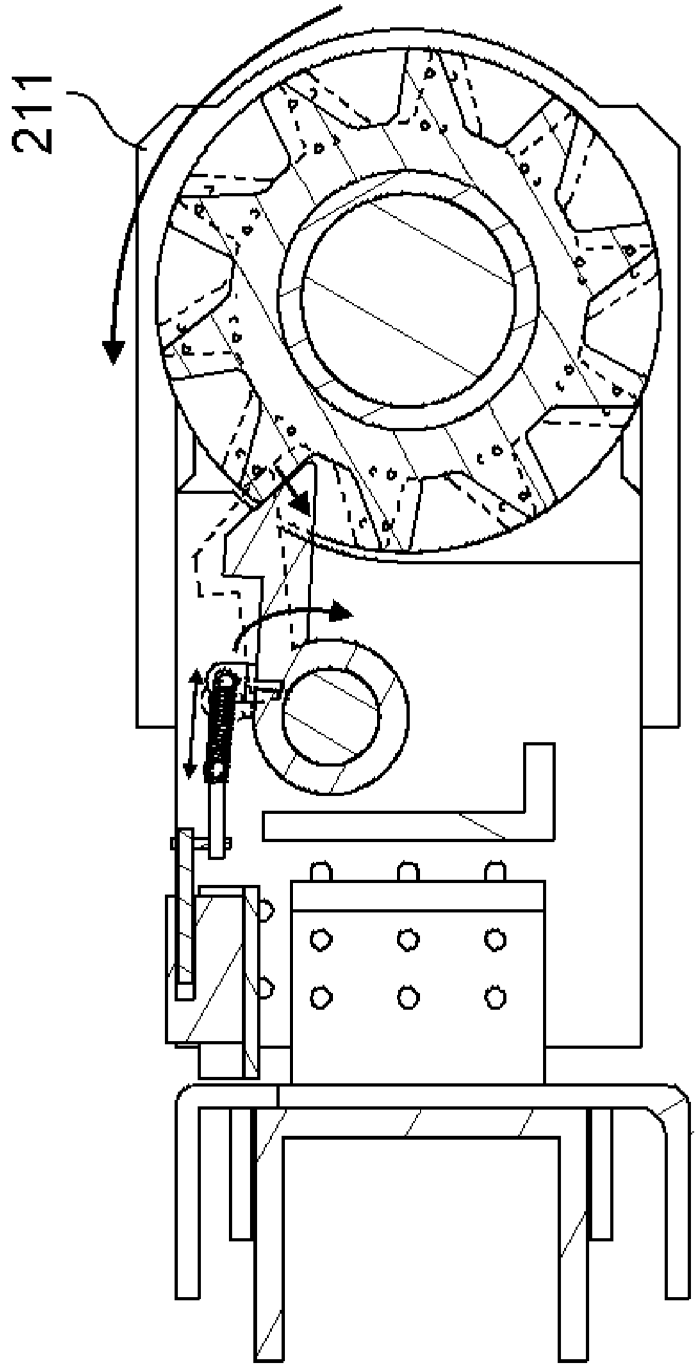

FIGS. 8A and 8B are sectional views illustrating an operational process of a rotation limiting part of FIG. 7.

FIG. 8A illustrates a process that the retaining part 312 is inserted into the ratchet wheel 11 by the driving part 33 when the reverse rotation detection sensor outputs an overspeed detection signal or a reverse rotation detection signal, and FIG. 8B illustrates a process that the tension spring 321 of the connection part 32 is extended and the retaining part 312 of the pawl is perfectly inserted into the ratchet wheel 11 when the pawl 31 inserted into the ratchet wheel 11 is pressed by the gears of the ratchet wheel 11.

As illustrated in FIG. 8A, the overspeed and reverse drive preventing device 1 for an escalator moves the driving bar 324 forwards when the reverse rotation detection sensor outputs the overspeed detection signal or the reverse rotation detection signal, so that the connection plate 323 and the connection bar 322 show forward rectilinear movement together.

In this instance, the tension spring 321 performs rectilinear motion and rotational motion at the same time since an end portion of the tension spring 321 is rotatably connected with the connection bar 322. Because the other end portion of the tension spring 321 is hinge-coupled with the connector 313 of the pawl 31, the retaining part 312 of the pawl 31 is inserted into the gears of the ratchet wheel 11.

As illustrated in FIG. 8B, when the retaining part 312 of the pawl 31 is inserted into the gears of the ratchet wheel 11 and presses the gears of the ratchet wheel 11 rotating reversely, the pawl 31 is rotated and the retaining part 312 of the pawl 31 is perfectly inserted into the ratchet wheel 11.

In this instance, because the driving bar 324 coupled with the driving part 33 is limited in the distance to move forwards from the driving part 33, the driving bar 324, the connection plate 323, and the connection bar 322 are limited in forward movement ranges, but the limited movement ranges are expanded when the tension spring 321 of the connection part 32 is extended by rotational force of the ratchet wheel 11.

Therefore, the retaining part 312 of the pawl 31 is perfectly inserted into the gears of the ratchet wheel 11, and so, braking power is increased due to an increase of contact area between the retaining part 312 of the pawl 31 and the gears of the ratchet wheel 11, so that the overspeed and reverse drive preventing device 1 for an escalator according to the present invention can effectively prevent reverse drive of the escalator.

Additionally, the pawl 31 is pressed rearwards by the rotational force of the ratchet wheel 11 when being inserted between the gears of the ratchet wheel 11, and the frictionally movable body 21 coupled with the pawl 31 is also pressed rearwards.

In addition, the frictionally movable body 21 moves rearwards if the rotational force of the ratchet wheel 11 is stronger than fastening force of the bolts inserted into the first bolt insertion holes 2125 to fasten the frictionally movable body 21 and the supporter 22 with each other, and the braking member 2113 of the brake arm 211 mounted at the front of the frictionally movable body 21 gets in contact with the stopper 14.

In this instance, the braking member 2113 of the brake arm 211 gets in contact with the stopper 14 to apply friction force in the opposite direction to the rotational direction of the stopper 14 so that braking power applied to the escalator rotary shaft 500 is increased.

Figure 9:
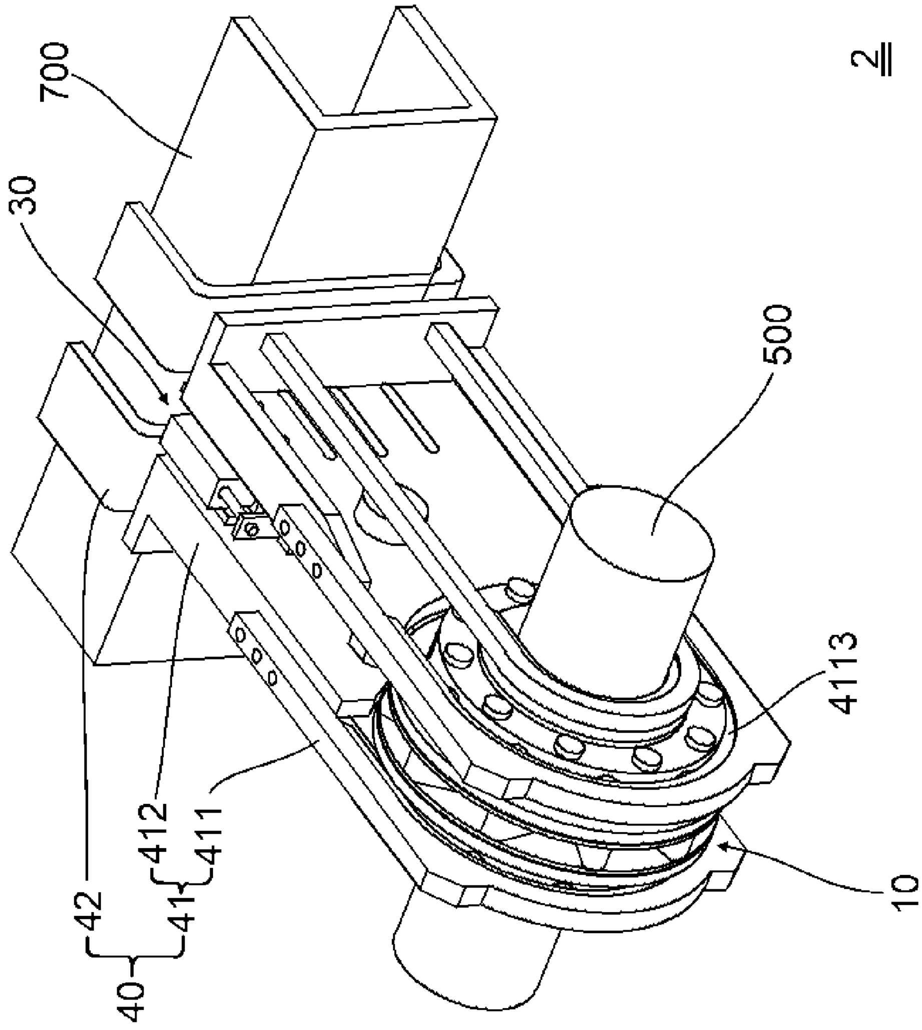
FIG. 9 is a perspective view illustrating an overspeed and reverse drive preventing device according to a second preferred embodiment of the present invention.
Figure 10:
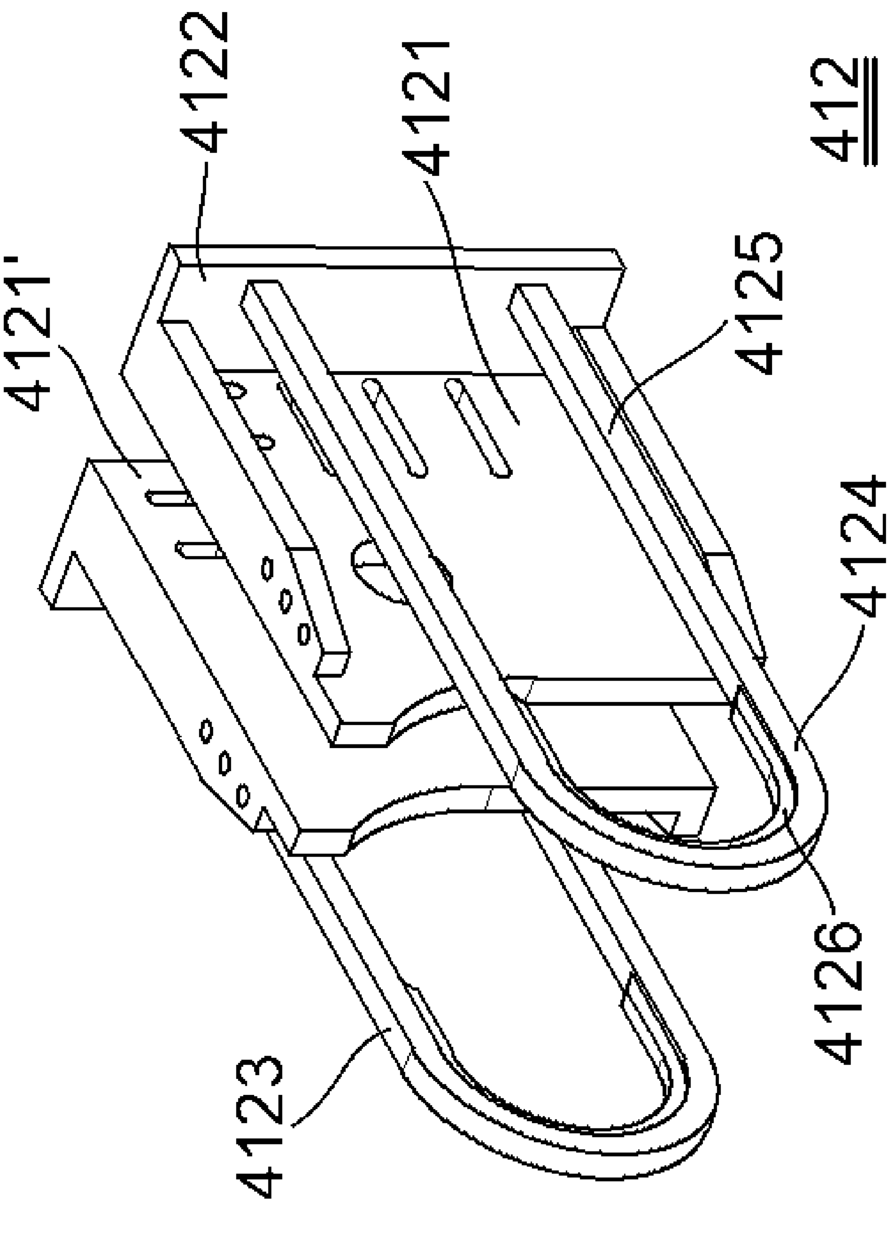
FIG. 10 is a perspective view of a pawl support of FIG. 9.

FIG. 9 is a perspective view illustrating an overspeed and reverse drive preventing device according to a second preferred embodiment of the present invention, and FIG. 10 is a perspective view of a pawl support of FIG. 9.

The overspeed and reverse drive preventing device 2 according to the second preferred embodiment of the present invention includes a ratchet part 10 and a rotation limiting part 30 which have the same shapes and structures as the ratchet part 10 and the rotation limiting part 30 illustrated in FIGS. 3 and 4, and also includes a second support part 40 which is different in shape and structure from the support part 20.

Figure 1:
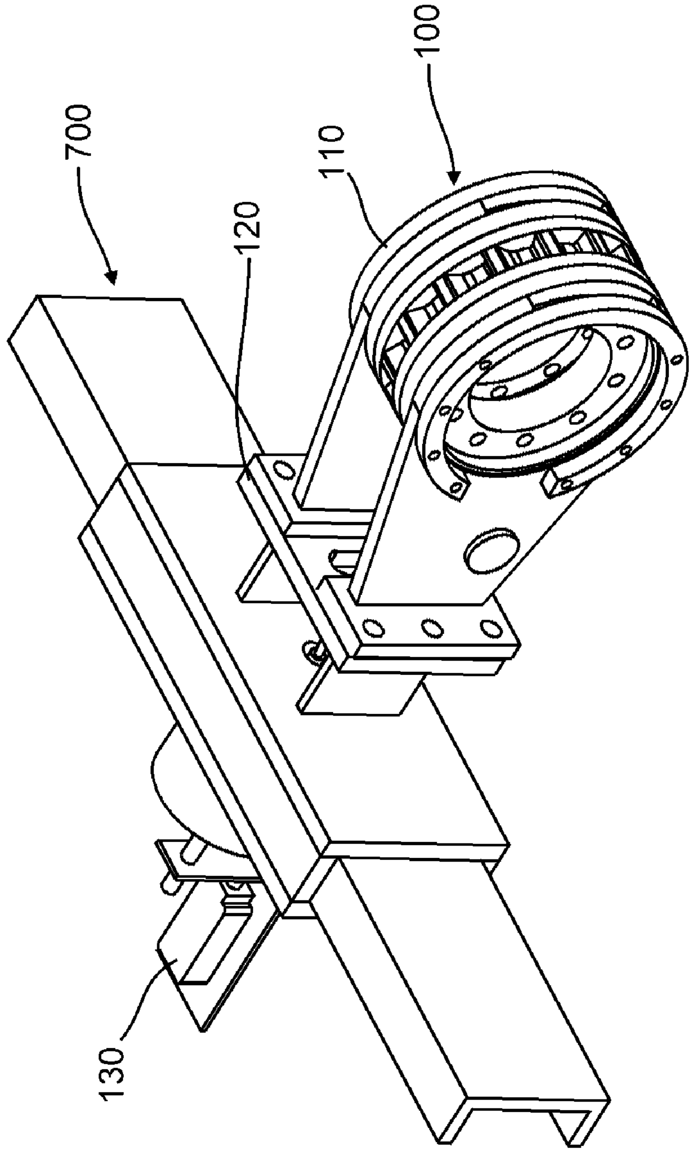
FIG. 1 is a perspective view of a conventional art.
Figure 2:
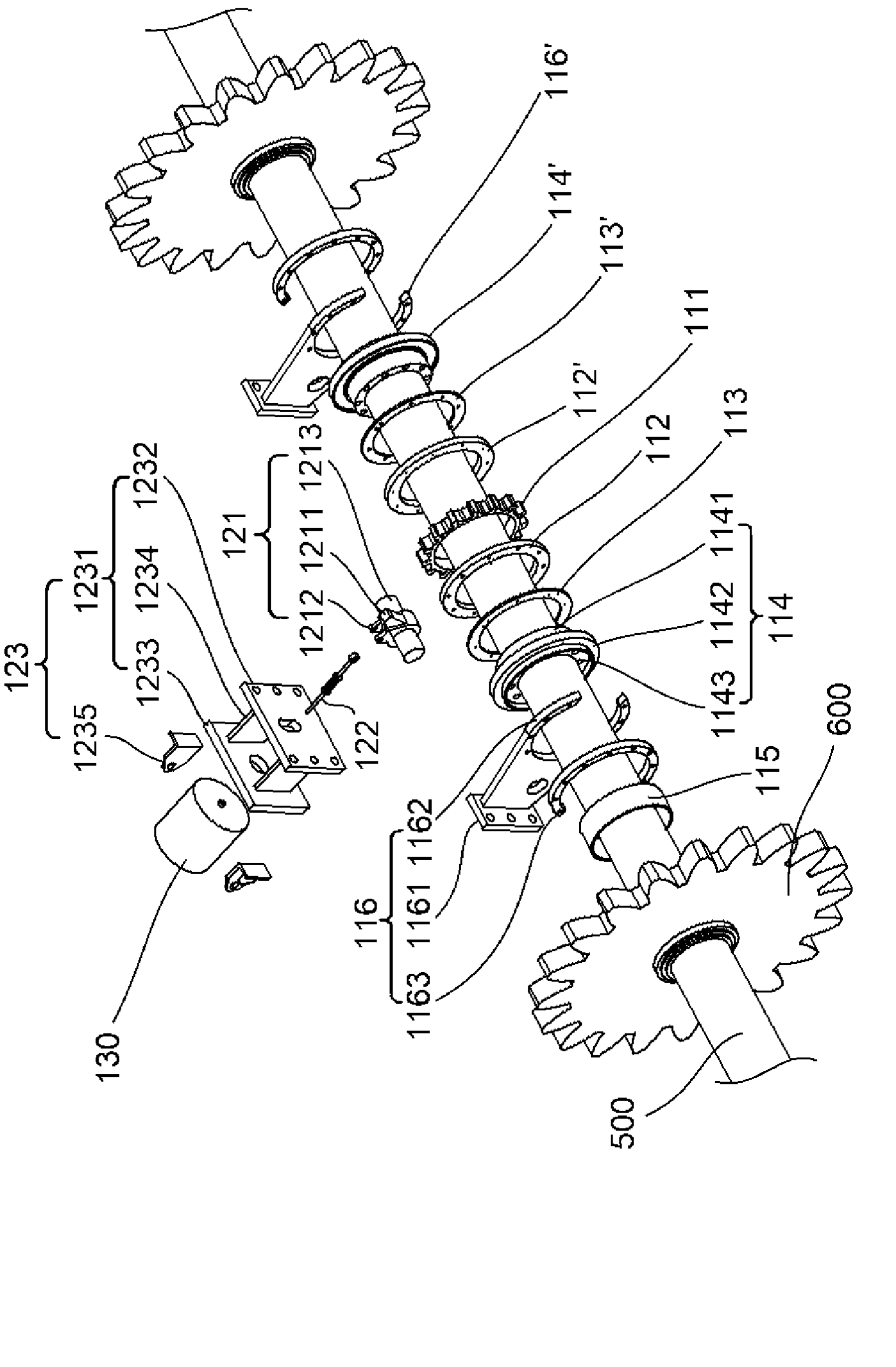
FIG. 2 is an exploded perspective view of FIG. 1.

The second support part 40 includes a supporter 42 having the same shape and structure as the supporter 22 of FIG. 2, and a frictionally movable body 41 which is different in shape and structure from the frictionally movable body 21 of FIG. 6.

Moreover, the frictionally movable body 41 includes a brake arm 411 having the same shape and structure as the brake arm 211 of FIG. 6, and a pawl support 412 which is different in shape and structure from the pawl support 212 of FIG. 6.

The pawl support 412 includes a pair of flat plates 4121 and 4121' and a connection plate (not shown) for connecting the flat plates 4121 and 4121' with each other, rear flanges 4122 formed at the rear end portions of the flat plates 4121 and 4121' to extend outwards, and auxiliary brake arms 4123 of a "⊂" shape respectively mounted on the front surfaces of the rear flanges 4122.

The rear flanges 4122 are extended outwards from the rear end portion of the flat plates 4121 and 4121', and rear end portions of the auxiliary brake arms 4123 are respectively coupled to the front surfaces of the rear flanges 4122.

The auxiliary brake arm 4113 includes a curve part 4124 of a semicircular ring shape, an extension part 4125 extending from both end portions of the curved part 4124, and a braking member 4126 mounted on the inner peripheral surfaces of the curved part 4124 and the extension part 4125.

In this instance, for convenience of explanation, it is illustrated that the braking member 4126 is mounted on the inner peripheral surface of the auxiliary brake arm 4123, but the mounting position of the braking member 4126 is not limited by the above, and may be mounted on the outer peripheral surface of the escalator rotary shaft 500 getting in contact with the inner peripheral surface of the auxiliary brake arm 4123.

Additionally, the inner diameter of the curved part 4124 is larger than the outer diameter of the escalator rotary shaft 500. In addition, the diameter of the inner peripheral surface of the braking member 4126 mounted on the inner peripheral surfaces of the curved part 4124 and the extension part 4125 is also larger than the outer diameter of the escalator rotary shaft 500.

Moreover, the rear end portion of the extension part 4125 is coupled with the rear flange 4122.

According to the second preferred embodiment of the present invention, when the pawl 31 is inserted into the gears of the ratchet wheel 1 and the frictionally movable body 21 is moved rearwards by rotational force applied by the ratchet wheel 11, the braking members 4113 mounted on the brake arms 411 get in contact with the stoppers 14 to apply friction force to the stoppers 14, and the braking members 4126 mounted on the auxiliary brake arms 4123 get in contact with the escalator rotary shaft 500 to apply friction force to the rotary shaft 500. So, braking power applied to the escalator rotary shaft 500 is increased.

The overspeed and reverse drive preventing device 2 according to the second preferred embodiment of the present invention can prevent reverse drive of the escalator more effectively since increasing braking power more than the case that the rotation of the escalator rotary shaft 500 is stopped just by the friction force of the braking members 223 mounted on the brake linings 131 and the brake arms 211.

In this instance, for convenience of explanation, it is illustrated that the overspeed and reverse drive preventing device 2 according to the second preferred embodiment of the present invention includes the brake arms 411 and the auxiliary brake arms 4123, but the present invention is not limited to the above, and only the auxiliary brake arms 4123 may be mounted according to installation environment.

Figure 11:
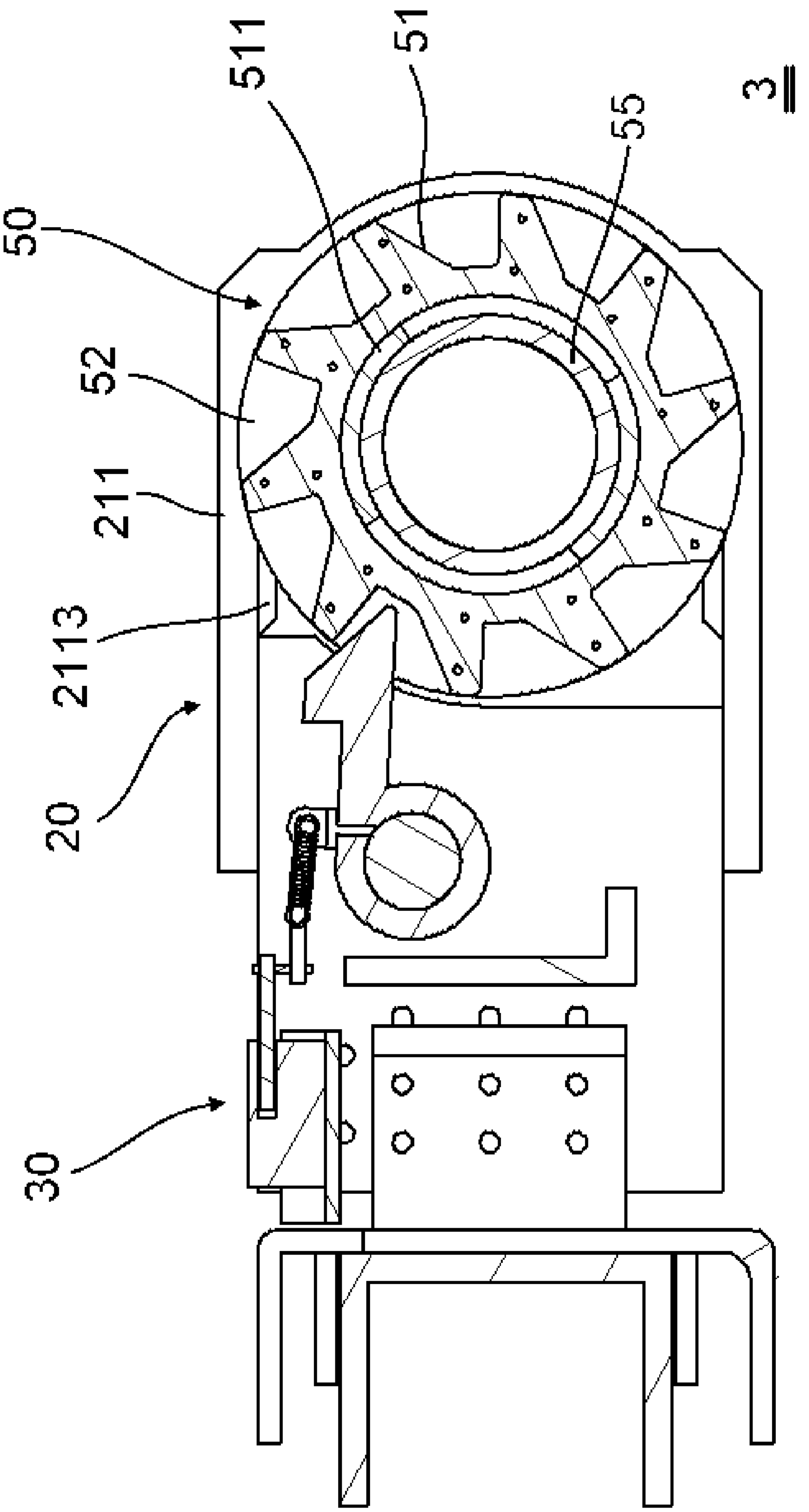
FIG. 11 is a sectional view illustrating an overspeed and reverse drive preventing device according to a third preferred embodiment of the present invention.
Figure 12:
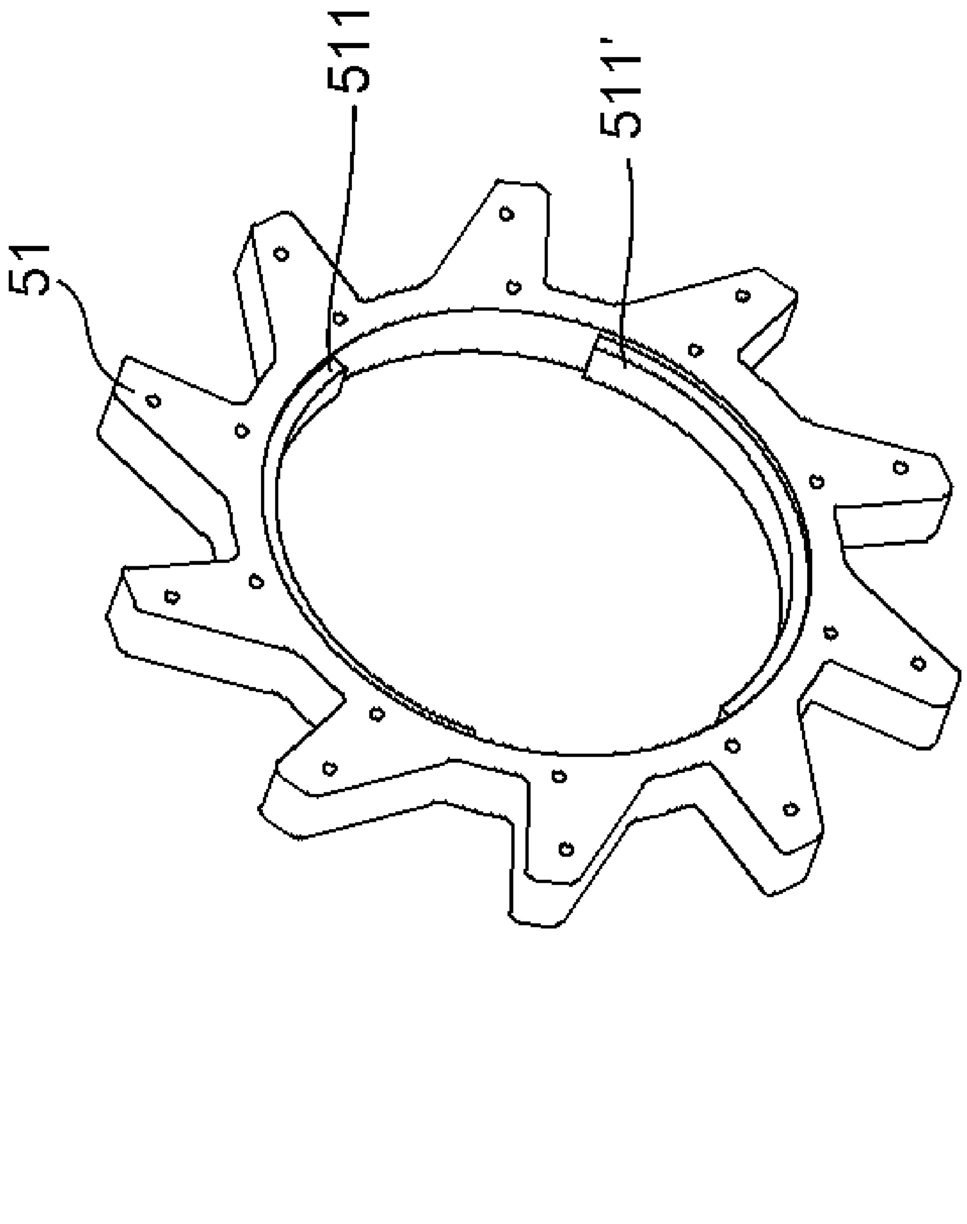
FIG. 12 is a perspective view of a ratchet wheel of FIG. 11.

FIG. 11 is a sectional view illustrating an overspeed and reverse drive preventing device according to a third preferred embodiment of the present invention, and FIG. 12 is a perspective view of a ratchet wheel of FIG. 11.

The overspeed and reverse drive preventing device 3 according to the third preferred embodiment of the present invention includes a support part 20 and a rotation limiting part 30 which have the same shapes and structures as the support part 20 and the rotation limiting part 30 illustrated in FIGS. 3 and 4, and also includes a second ratchet part 50 which is different in shape and structure from the ratchet part 10.

The second ratchet part 50 includes discs 52 and 52', brake part 53 and 53', stoppers 54 and 54', and a base 55 which respectively have the same shapes and structures as the discs 12 and 12', the brake part 13 and 13', the stoppers 14 and 14', and the base 15 illustrated in FIG. 5, and also includes a ratchet wheel 51 which is different in shape and structure from the ratchet wheel 11.

The ratchet wheel 51 has gears of a saw-toothed shape formed on the outer face thereof, and includes a shaft insertion hole formed therein.

In this instance, the inner diameter of the shaft insertion hole formed in the ratchet wheel 51 is larger than the outer diameter of the base 55.

Additionally, the ratchet wheel 51 includes braking members 511 and 511' mounted on the inner peripheral surface of the shaft insertion hole.

The braking members 511 and 511' are formed in an arc shape, and are mounted on the inner peripheral surface of the shaft insertion hole of the ratchet wheel 51.

In addition, the braking members 511 and 511' are made of a material with high coefficient of friction.

Moreover, the braking members 511 and 511' generate friction since the inner peripheral surface gets in contact with the outer peripheral surface of the base 55 when the ratchet wheel 51 is inserted into the base 55.

In this instance, for convenience of explanation, it is illustrated that two braking members of the arc shape are mounted on the inner peripheral surface of the ratchet wheel 51, but the mounting position, the shape and the number of the braking members are not limited to the above, but may be mounted on the outer peripheral surface of the base 55.

In case of the overspeed and reverse drive preventing device 3 according to the third preferred embodiment of the present invention, when the escalator rotary shaft rotates reversely, friction force is applied by the brake linings 131 and the braking members 2113, and at the same time, friction force is applied between the base 55 and the braking members 511 and 511' mounted on the inner peripheral surface of the ratchet wheel 51.

Therefore, the overspeed and reverse drive preventing device 3 according to the third preferred embodiment of the present invention can prevent reverse drive of the escalator more effectively since increasing braking power more than the case that the rotation of the escalator rotary shaft 500 is stopped just by the friction force of the brake linings 131 and the braking members 2113 of the brake arms 211.

Figure 13:
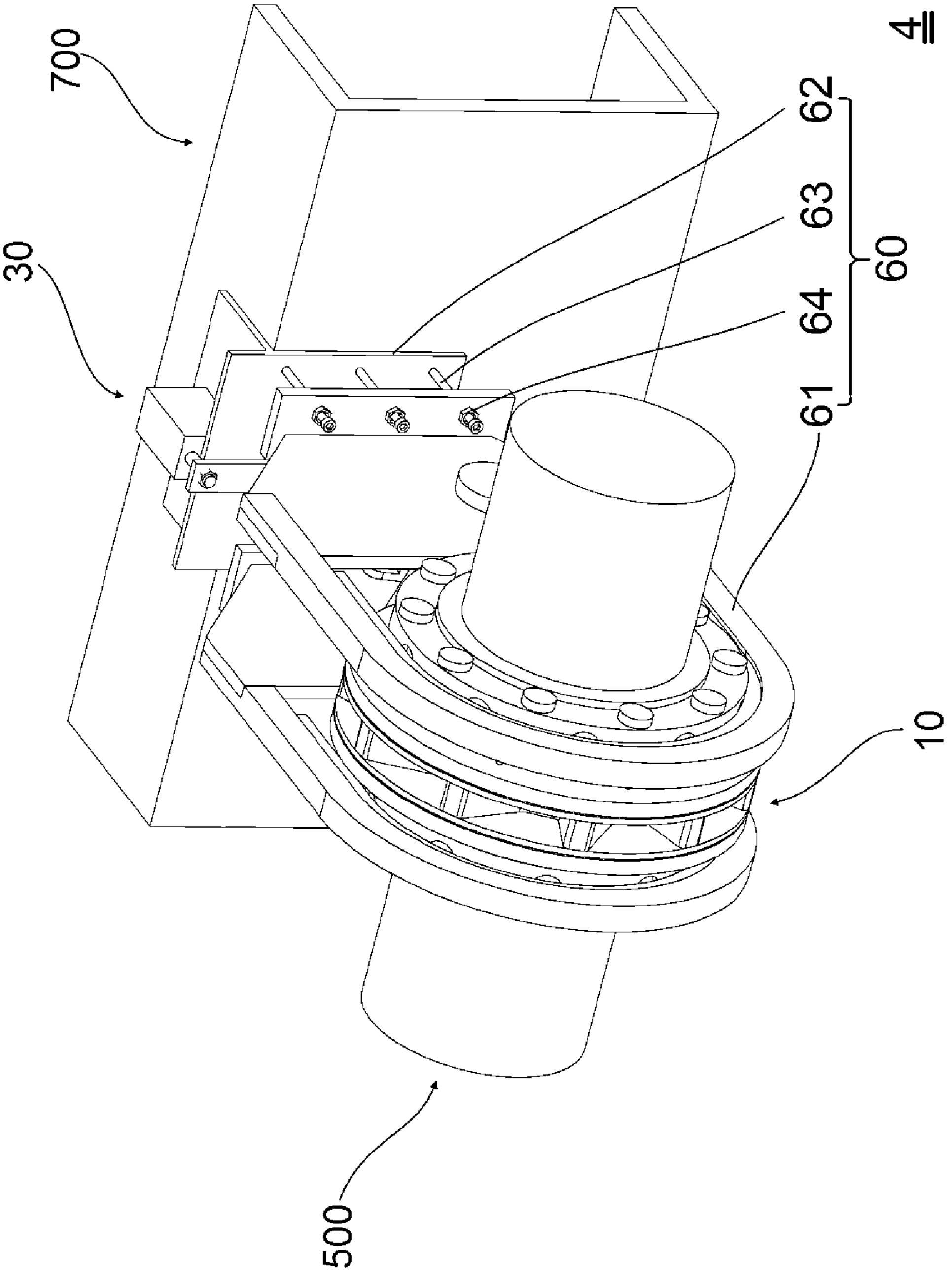
FIG. 13 is a perspective view illustrating an overspeed and reverse drive preventing device according to a fourth preferred embodiment of the present invention.
Figure 14:
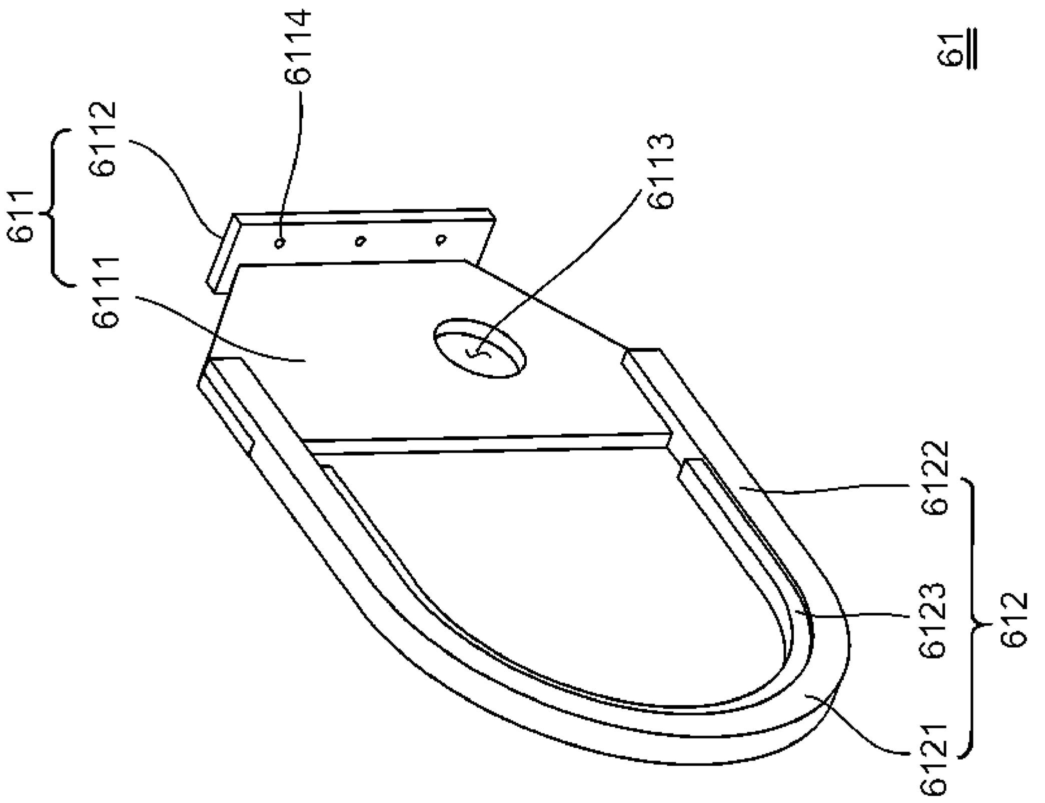
FIG. 14 is a perspective view of a main bracket of FIG. 13.

FIG. 13 is a perspective view illustrating an overspeed and reverse drive preventing device according to a fourth preferred embodiment of the present invention, and FIG. 14 is a perspective view of a main bracket of FIG. 13.

The overspeed and reverse drive preventing device 4 according to the fourth preferred embodiment of the present invention includes a ratchet part 10 and a rotation limiting part 30 which have the same shapes and structures as the ratchet part 10 and the rotation limiting part 30 illustrated in FIGS. 3 and 4, and also includes a third support part 60 which is different in shape and structure from the support part 20.

The third support part 60 includes: a pair of main brackets 61 respectively getting in contact with the outer peripheral surface of the stoppers 14 and 14' through a shock absorber (not shown); a fixed bracket 62 caught to the escalator support frame 700; and connection bolts 63 for connecting the main brackets 61 and the fixed bracket 62 with each other.

Each of the main brackets 61 includes a first bracket 611 which is connected with the fixed bracket 62 by the connection bolt 63 to be supported, and a second bracket 612 which is formed in a "U" shape to surround the stopper 14 and of which both end portions are coupled with the first bracket 611.

In this instance, the first bracket 611 includes a plate 6111, and a connection plate 6112 connected with the plate 6111 at right angles.

Furthermore, the plate 6111 includes a pawl shaft insertion hole 6113 formed in the middle thereof so that a pawl shaft 314 of the rotation limiting part 30 is inserted into the pawl shaft insertion hole 6113.

Additionally, the connection plate 6112 has connection bolt insertion holes 6114 into which connection bolts 63 are inserted.

The second bracket 612 includes a stopper contact part 6121 of a semicircular ring shape, and an extension part 6122 extending from both end portions of the stopper contact part 6121, and the extension part 6122 is coupled with the plate 6111 of the first bracket 611 by bolts.

In this instance, the stopper contact part 6121 has the diameter of the inner peripheral surface which is larger than the diameter of the outer peripheral surface of the stopper, and a shock absorber (not shown) is mounted on the inner peripheral surface of the stopper contact part 6121.

The main bracket 61 gets in contact with the stopper 14 of the ratchet part 10 by the shock absorber, and absorbs shock generated when the rotation of the ratchet part 10 is limited by the rotation limiting part 30. That is, the main bracket 61 can sufficiently absorb shock generated when reverse drive of the escalator is prevented even though there is no load reinforcement device.

The fixed bracket 62 includes a horizontal part 621 of a flat plate shape and a vertical part 622 formed in a flat plate shape and vertically mounted at an end portion of the horizontal part 621. The lower surface of the horizontal part 621 gets in contact with the upper surface of the escalator support frame 700, and the rear surface of the vertical part 622 gets in contact with the front surface of the escalator support frame 700.

In this instance, the vertical part 622 includes connection bolt coupling grooves (not shown) formed at positions corresponding to the connection bolt insertion holes 6114 formed in the connection plate 6112.

The connection bolts 63 are respectively inserted into the connection bolt insertion holes 6114 formed in the connection plate 6112 of the main bracket 61, and are respectively fastened to connection bolt coupling grooves 6221 formed in the vertical part 622 of the fixed bracket 62 so as to connect the main bracket 61 and the fixed bracket 62 with each other.

In this instance, the connection bolts 63 are fastened by nuts 64 fastened to the front and rear surfaces of the connection plate 6112, and a distance between the main bracket 61 and the fixed bracket 62 is adjusted according to positions of the fastened nuts 64.

Moreover, the fixed bracket 62 and the escalator support frame 700 are coupled with each other when the end portions of the connection bolts 63 fastened to the connection bolt coupling grooves of the vertical part 622 press the escalator support frame 700.

The third support part 60 can adjust the positions of the nuts 64 fastened to the connection bolts 63 in order to adjust the distance between the main bracket 61 and the fixed bracket 62, even though the distance between the escalator rotary shaft 500 and the escalator support frame 700 is changed due to different kinds or heights of various escalators. Therefore, the overspeed and reverse drive preventing device 4 for an escalator can be installed smoothly.

Furthermore, because the third support part 60 is mounted by pressure of the escalator support frame 700 and the connection bolts 63, there is no need to perforate the escalator support frame 700. Therefore, the overspeed and reverse drive preventing device 4 according to the fourth preferred embodiment of the present invention can reduce installation time, and prevent deterioration in durability of the escalator support frame 700 caused by perforation.

Figure 16:
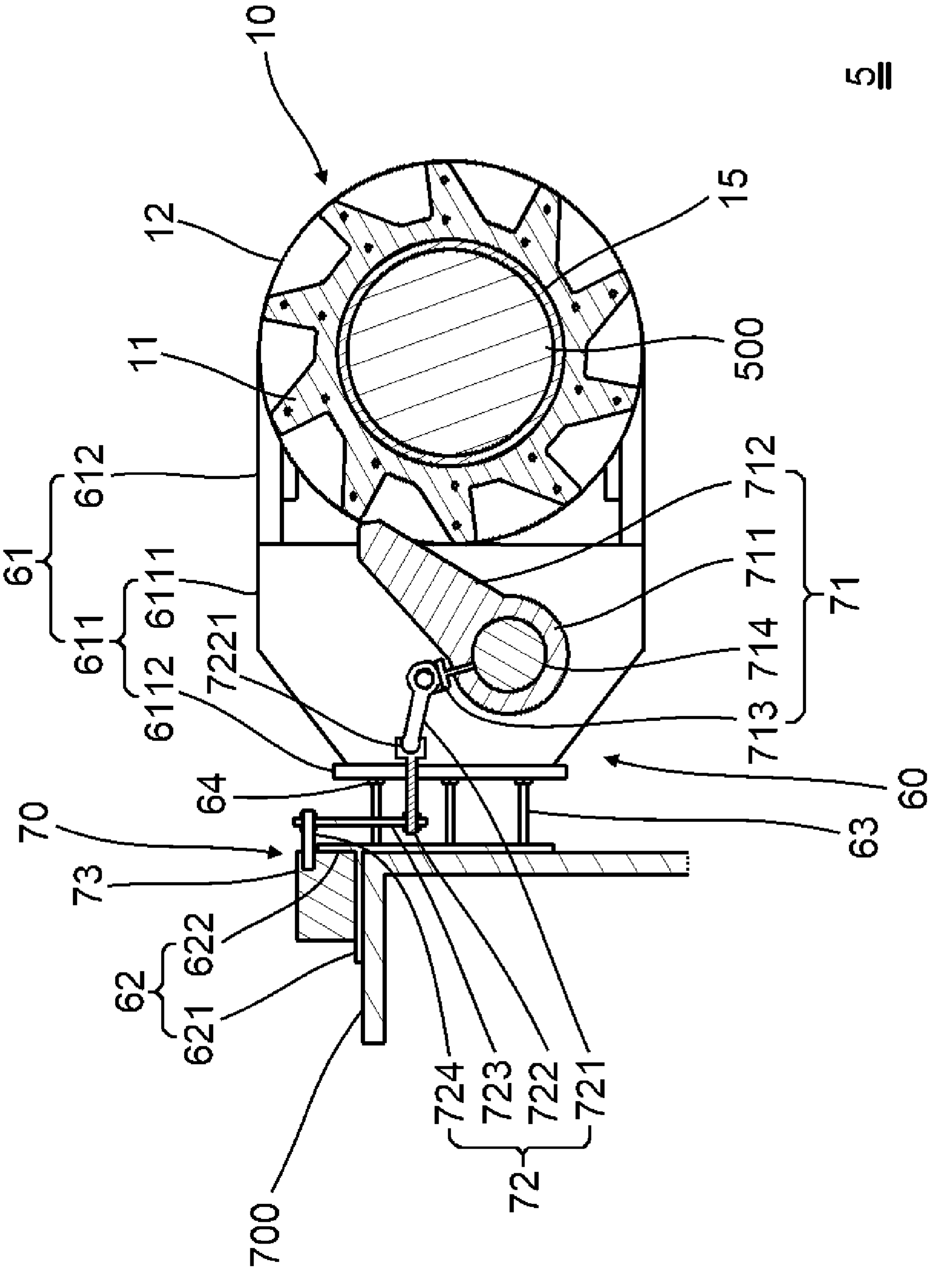
FIG. 16 is a sectional view illustrating an overspeed and reverse drive preventing device according to a fifth preferred embodiment of the present invention.

FIG. 16 is a sectional view illustrating an overspeed and reverse drive preventing device according to a fifth preferred embodiment of the present invention.

Figure 15:
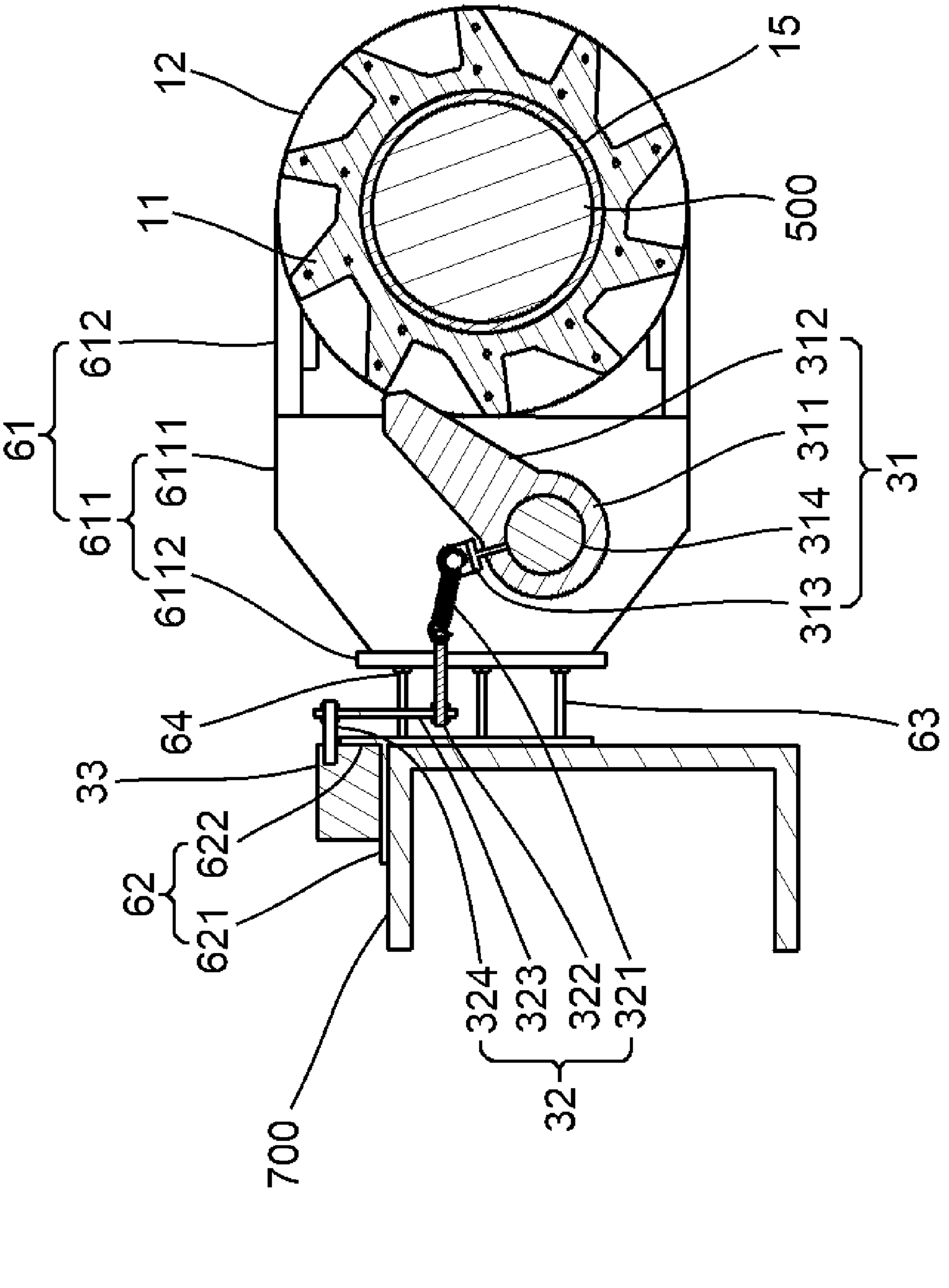
FIG. 15 is a sectional view of FIG. 13.

The overspeed and reverse drive preventing device 5 according to the fourth preferred embodiment of the present invention includes a ratchet part 10 and a third support part 60 30 which have the same shapes and structures as the ratchet part 10 and the third support part 60 illustrated in FIGS. 13 to 15, and also includes a second rotation limiting part 70 which is different in shape and structure from the rotation limiting part 30.

The second rotation limiting part 70 includes a pawl 71 and a driving part 73 having the same shapes and structures as the pawl 31 and the driving part 33 of FIG. 7, and further includes a connection part 72 which is different in shape and structure from the connection part 32.

The connection part 72 includes a connection plate 723 and a driving bar 724 having the same shapes and structures as the connection plate 323 and the driving bar 324 of FIG. 7, and further includes a connection bar 722 which is different in shape and structure from the connection bar 322.

The connection bar 722 has an end portion coupled with the connection plate 723, and has a ball joint 7221 formed at an end portion opposed to the end portion which is coupled with the connection plate 723.

Additionally, the connection part 72 has an end portion rotatably connected with the connection bar 722 by the ball joint 7221, and further includes a rotational connection bar 721 hinge-coupled with a connector 713 of the pawl 71.

The rotational connection bar 721 is connected with the connection bar 722 at a predetermined angle before the driving part 73 is operated.

Figure 17:
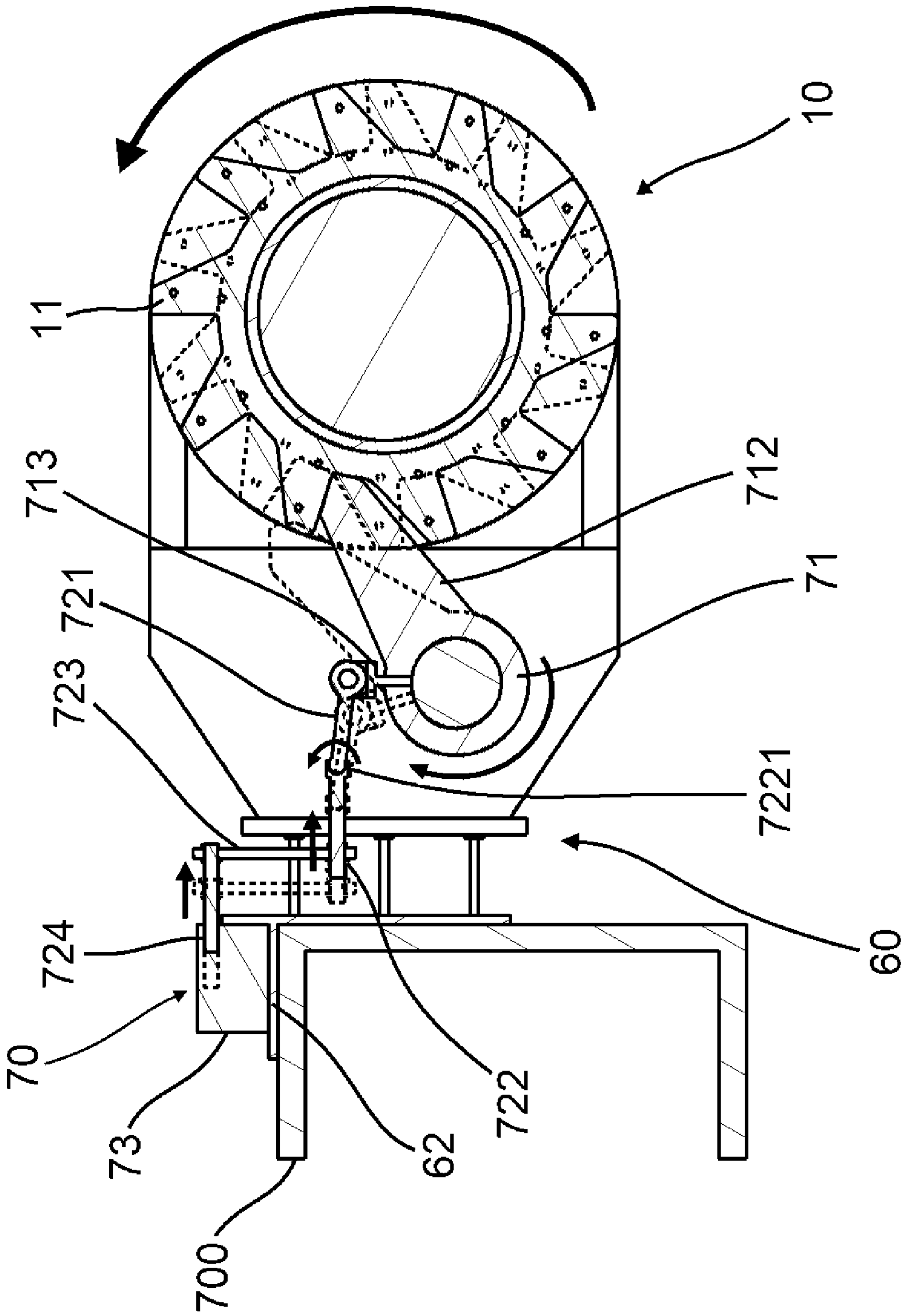
FIG. 17 is a sectional view illustrating an operational process of a rotation limiting part of FIG. 16.

FIG. 17 is a sectional view illustrating an operational process of a rotation limiting part of FIG. 16.

As illustrated in FIG. 17, the overspeed and reverse drive preventing device 5 according to the fifth preferred embodiment of the present invention moves the driving bar 724 forwards when the detection sensor senses overspeed or reverse drive, so that the connection plate 723 and the connection bar 722 perform a forward rectilinear motion together.

In this instance, because an end portion of the rotational connection bar 721 is rotatably connected with the connection bar 722 by the ball joint 7221, the rotational connection bar 721 performs a rectilinear motion and a rotational motion at the same time. Furthermore, because the other end portion of the rotational connection bar 721 is hinge-coupled with the connector 713 of the pawl 71, the rotational connection bar 721 moves forwards together with the connection bar 722, the connection plate 723, and the driving bar 724, so that the pawl 71 connected with the rotational connection bar 721 is rotated and the retaining part 712 of the pawl 71 is inserted into the saw-teeth of the ratchet wheel 11.

Additionally, when the retaining part 712 of the pawl 71 is inserted into the saw-teeth of the ratchet wheel 11 and is pressed down in a state where it gets in contact with the saw-teeth of the ratchet wheel 11 which is overspeeding or driving reversely, the pawl 71 is rotated, and the retaining part 712 of the pawl 71 is perfectly inserted into the saw-teeth of the ratchet wheel 11.

In this instance, because the driving bar 724 coupled with the driving part 73 is limited in the distance to move forwards from the driving part 73, the driving bar 724, the connection plate 723, and the connection bar 722 are limited in forward movement ranges. However, when the retaining part 712 of the pawl 71 is pressed by the saw-teeth of the ratchet wheel 11, because the rotational connection bar 721 is coupled with the connection bar 722 by the ball joint 7221, the coupling angle between the connection bar 722 and the rotational connection bar 721 is changed and the forward movement ranges are expanded.

Therefore, the retaining part 712 of the pawl 71 is perfectly inserted into the saw-teeth of the ratchet wheel 11, and the contact area between the retaining part 712 of the pawl 71 and the saw-teeth of the ratchet wheel 11 is increased so as to increase braking power. So, the overspeed and reverse drive preventing device 5 according to the fifth preferred embodiment of the present invention can effectively prevent overspeed or reverse drive of the escalator.

What is claimed is:

1. An overspeed and reverse drive preventing device for an escalator comprising:

a ratchet part including a ratchet wheel rotatably mounted on an escalator rotary shaft, and friction parts mounted at both sides of the ratchet wheel to be in frictional contact with the ratchet wheel and coupled with the rotary shaft to be rotated together with the rotary shaft;

a detection sensor for sensing rotation of the rotary shaft;

a support frame which is a structure installed inside the escalator to support another object;

a support part mounted on the support frame; and a rotation limiting part mounted on the support part in order to limit the rotation of the ratchet wheel when a retaining part is inserted into the ratchet wheel, wherein the support part includes:

a supporter coupled with the support frame; and a frictionally movable body of which one side is coupled with the supporter and which is mounted to be spaced apart from the ratchet part, and wherein when the detection sensor senses overspeed or reverse rotation of the rotary shaft, the retaining part of the rotation limiting part is inserted into the ratchet wheel and is pressed by rotational force of the ratchet wheel to move the frictionally movable body rearwards, so that the frictionally movable body comes into contact with the outer peripheral surface of the ratchet part so as to generate friction.

2. The overspeed and reverse drive preventing device according to claim 1, wherein the frictionally movable body includes:

brake arms which have a space formed therein, into which the rotary shaft is inserted, and which are mounted to be spaced apart from the rotary shaft; and pawl supports which are respectively coupled with the brake arms, and, on which the rotation limiting part is mounted.

3. The overspeed and reverse drive preventing device according to claim 2, wherein braking members for generating braking power during friction are mounted on any one among the inner peripheral surfaces of the brake arms, outer peripheral surface of the friction part, and the outer peripheral surface of the rotary shaft.

4. The overspeed and reverse drive preventing device according to claim 3, wherein the ratchet part further includes a pair of discs which are formed in a hollow disc shape and are respectively coupled to right and left sides of the ratchet wheel, wherein the friction part includes:

brake parts which are formed in a hollow disc shape and respectively get in contact with the outer surfaces of the discs by the braking members mounted on the inner surface thereof; and stoppers which are formed in a hollow cylindrical shape, are mounted on the outer faces of the brake parts, and are coupled with the brake parts by pressing bolts, wherein the stoppers are coupled with the escalator rotary shaft to be rotated together when fastening bolts are fastened to fastening bolt holes formed from the outer peripheral surface to the inner peripheral surface to communicate with the inner face and end portions of the fastening bolts press the rotary shaft, and wherein the brake parts are pressed by the pressing bolts respectively coupled with the stoppers so as to get in close contact with the discs.

5. The overspeed and reverse drive preventing device according to claim 4, wherein the rotation limiting part includes:

a pawl rotatably which is mounted on the pawl support and of which one end portion is inserted into the ratchet wheel at the time of rotation;

a connection part connected with the pawl; and a driving part which operates the connection part to rotate the pawl, wherein the connection part includes:

a tension spring of which one end portion is connected with the pawl;

a connection bar of which one end portion is connected with the other end portion of the tension spring;

a connection plate which is formed in a plate shape and which is coupled with the other end portion of the connection bar; and a driving bar of which both end portions are respectively coupled to the connection plate and the driving part, and wherein when the pawl is inserted into the ratchet part, the connection part is extended so that the pawl is perfectly inserted into the ratchet part.

6. An overspeed and reverse drive preventing device for an escalator comprising:

a ratchet part including a ratchet wheel rotatably mounted on an escalator rotary shaft, and friction parts mounted at both sides of the ratchet wheel to be in frictional contact with the ratchet wheel and coupled with the rotary shaft to be rotated together with the rotary shaft;

a detection sensor for sensing rotation of the rotary shaft;

a support frame which is a structure installed inside the escalator to support another object;

a support part mounted on the support frame; and a rotation limiting part mounted on the support part in order to limit the rotation of the ratchet wheel when a retaining part is inserted into the ratchet wheel, wherein the support part includes:

a supporter coupled with the support frame; and a frictionally movable body of which one side is coupled with the supporter and which is mounted to be spaced apart from the rotary shaft, and wherein when the detection sensor senses overspeed or reverse rotation of the rotary shaft, the retaining part of the rotation limiting part is inserted into the ratchet wheel and is pressed by rotational force of the ratchet wheel to move the frictionally movable body rearwards, so that the frictionally movable body comes into contact with the outer peripheral surface of the ratchet part so as to generate friction.

7. The overspeed and reverse drive preventing device according to claim 6, wherein the frictionally movable body includes:

brake arms which have a space formed therein, into which the rotary shaft is inserted, and which are mounted to be spaced apart from the rotary shaft; and pawl supports which are respectively coupled with the brake arms, and, on which the rotation limiting part is mounted.

8. An overspeed and reverse drive preventing device for an escalator comprising:

a ratchet part including a ratchet wheel rotatably mounted on an escalator rotary shaft, and friction parts mounted at both sides of the ratchet wheel to be in frictional contact with the ratchet wheel and coupled with the rotary shaft to be rotated together with the rotary shaft;

a detection sensor for sensing rotation of the rotary shaft;

a support frame which is a structure installed inside the escalator to support another object;

a support part mounted on the support frame to support the ratchet part; and a rotation limiting part mounted on the support part in order to limit the rotation of the ratchet wheel when a retaining part is inserted into the ratchet wheel, wherein the rotation limiting part includes:

a pawl rotatably mounted on the support part;

a connection part of which one end portion is coupled with the pawl; and a driving part with which the other end portion of the connection part is coupled, and, which moves the connection part forwards when the detection sensor senses overspeed or reverse rotation, wherein the connection part includes:

an extension part of which one end portion is connected with the pawl;

a connection bar of which one end portion is connected with the other end portion of the extension part;

a connection plate with which the other end portion of the connection bar is coupled; and a driving bar of which both end portions are respectively coupled to the connection plate and the driving part, and wherein the extension part extends the connection part so that the pawl is perfectly inserted into the ratchet wheel when the pawl is inserted into the ratchet wheel.

9. The overspeed and reverse drive preventing device according to claim 8, wherein the extension part is a tension spring, and both end portions of the extension part are respectively coupled to the pawl and the connection bar.

10. The overspeed and reverse drive preventing device according to claim 8, wherein the connection bar has a ball joint formed at one end portion thereof, and wherein the extension part is a rotational connection bar, and has one end portion connected with the pawl and the other end portion rotatably connected with the connection bar by the ball joint.

11. The overspeed and reverse drive preventing device according to claim 9, wherein the support part includes:

a pair of main brackets respectively mounted on the outer peripheral surfaces of the stoppers to get in contact with the outer peripheral surfaces of the stoppers;

a fixed bracket mounted at the escalator support frame to be caught;

connection bolts for connecting the main brackets and the fixed bracket with each other; and nuts fastened to the connection bolts, and wherein the support part is coupled with the escalator main brackets when end portions of the connection bolts press the escalator main brackets.

* * * * *